United States Patent
Rathus et al.

(10) Patent No.: US 6,830,188 B2
(45) Date of Patent: Dec. 14, 2004

(54) METHOD AND APPARATUS FOR ACCESSING ELECTRONIC DATA VIA A FAMILIAR PRINTED MEDIUM

(76) Inventors: Spencer A. Rathus, 31 Knollwood Rd., Short Hills, NJ (US) 07078; Jeffrey S. Nevid, 382 Central Park West, #11D, New York, NY (US) 10025; Lois Fichner-Rathus, 31 Knollwood Rd., Short Hills, NJ (US) 07078

( * ) Notice: Subject to any disclaimer, the term of this patent is extended or adjusted under 35 U.S.C. 154(b) by 63 days.

(21) Appl. No.: 09/769,139

(22) Filed: Jan. 25, 2001

(65) Prior Publication Data

US 2001/0052538 A1 Dec. 20, 2001

Related U.S. Application Data

(60) Continuation of application No. 09/365,961, filed on Aug. 2, 1999, which is a continuation-in-part of application No. 08/628,246, filed on Apr. 4, 1996, now Pat. No. 5,932,863, which is a division of application No. 08/250,799, filed on May 25, 1994, now abandoned.

(51) Int. Cl.[7] ................................................. G06K 7/10
(52) U.S. Cl. .............................. 235/462.15; 235/472.01
(58) Field of Search ................................. 235/462, 472, 235/454, 455, 494, 470, 375, 383, 462.01, 462.02, 462.03–462.49, 472.01, 472.02, 472.03, 484, 380, 381, 382

(56) References Cited

U.S. PATENT DOCUMENTS

| | | | | |
|---|---|---|---|---|
| 4,488,035 A | * | 12/1984 | Withnall et al. ............. | 235/384 |
| 4,492,164 A | * | 1/1985 | Cassanas et al. ............ | 101/216 |
| 4,813,350 A | * | 3/1989 | Drillick ....................... | 101/76 |
| 4,825,058 A | * | 4/1989 | Poland ........................ | 235/475 |
| 4,868,375 A | * | 9/1989 | Blanford ..................... | 235/462 |
| 4,992,824 A | * | 2/1991 | Plummer ..................... | 355/38 |
| 5,003,577 A | * | 3/1991 | Ertz et al. ................ | 379/88.13 |
| 5,083,271 A | * | 1/1992 | Thacher et al. ............... | 700/92 |
| 5,148,297 A | * | 9/1992 | Ishii et al. .................... | 349/79 |
| 5,151,687 A | * | 9/1992 | Younger ..................... | 345/810 |
| 5,185,857 A | * | 2/1993 | Rozmanith et al. ......... | 395/148 |
| 5,237,156 A | * | 8/1993 | Konishi et al. ............. | 235/375 |
| 5,424,524 A | * | 6/1995 | Ruppert et al. ............. | 235/462 |
| 5,478,990 A | * | 12/1995 | Montanari et al. .......... | 235/375 |
| 5,541,394 A | * | 7/1996 | Kouchi et al. .............. | 235/375 |
| 5,570,291 A | * | 10/1996 | Dudle et al. ........... | 364/468.01 |

(List continued on next page.)

Primary Examiner—Thien M. Le
(74) Attorney, Agent, or Firm—John W. Olivo, Jr.

(57) ABSTRACT

The disclosed methods and apparatus relate generally to the electronics media industry, such as cable television (CATV), home shopping services, on-line computer services and computer memory applications. These methods and apparatus allow a user to access and make use of electronic media input and output devices by reference to and/or utilization of standard printed matter, such as magazines, textbooks, or any other printed matter that can be correlated to electronic media.

149 Claims, 16 Drawing Sheets

U.S. PATENT DOCUMENTS

| | | | | | |
|---|---|---|---|---|---|
| 5,590,173 | A | * | 12/1996 | Beasley | 705/26 |
| 5,640,002 | A | * | 6/1997 | Ruppert et al. | 235/472 |
| 5,640,193 | A | * | 6/1997 | Wellner | 348/7 |
| 5,774,664 | A | * | 6/1998 | Hidary et al. | 395/200.48 |
| 5,774,874 | A | * | 6/1998 | Veeneman et al. | 705/27 |
| 5,778,181 | A | * | 7/1998 | Hidary et al. | 395/200.48 |
| 5,857,156 | A | * | 1/1999 | Anderson | 455/517 |
| 5,869,819 | A | * | 2/1999 | Knowles et al. | 235/375 |
| 5,870,546 | A | * | 2/1999 | Kirsch | 395/200.33 |
| 5,905,248 | A | * | 5/1999 | Russell et al. | 235/462 |
| 5,913,210 | A | * | 6/1999 | Call | 707/4 |
| 5,918,214 | A | * | 6/1999 | Perkowski | 705/27 |
| 5,932,863 | A | * | 8/1999 | Rathus et al. | 235/462.15 |
| 5,940,595 | A | * | 8/1999 | Reber et al. | 395/200.57 |
| 5,963,915 | A | * | 10/1999 | Kirsch | 705/26 |
| 5,978,773 | A | * | 11/1999 | Hudetz et al. | 705/23 |
| 5,991,601 | A | * | 11/1999 | Anderson | 455/38.1 |
| 5,992,752 | A | * | 11/1999 | Wilz, Sr. et al. | 235/472.01 |
| 6,003,774 | A | * | 12/1999 | Bard et al. | 235/462.45 |
| 6,012,102 | A | * | 1/2000 | Shachar | 710/5 |
| 6,076,733 | A | * | 6/2000 | Wilz, Sr. et al. | 235/462.01 |
| 6,148,331 | A | * | 11/2000 | Parry | 705/218 |
| 6,152,369 | A | * | 11/2000 | Wilz, Sr. et al. | 235/462.01 |
| 6,154,738 | A | * | 11/2000 | Call | 707/4 |
| 6,199,048 | B1 | * | 3/2001 | Hudetz et al. | 705/23 |
| 6,226,412 | B1 | * | 5/2001 | Schwab | 382/232 |
| 6,269,336 | B1 | * | 7/2001 | Ladd et al. | 704/270 |
| 6,314,457 | B1 | * | 11/2001 | Schena et al. | 709/219 |
| 6,321,991 | B1 | * | 11/2001 | Knowles | 235/472.01 |
| 6,321,992 | B1 | * | 11/2001 | Knowles et al. | 235/472.01 |
| 6,330,244 | B1 | * | 12/2001 | Swarts et al. | 370/401 |
| 6,338,434 | B1 | * | 1/2002 | Wilz, Sr. et al. | 235/462.01 |
| 6,373,551 | B2 | * | 4/2002 | Manico et al. | 355/41 |
| 6,375,078 | B1 | * | 4/2002 | Russell et al. | 235/472.01 |
| 6,381,582 | B1 | * | 4/2002 | Walker et al. | 705/14 |
| 6,384,744 | B1 | * | 5/2002 | Philyaw et al. | 341/50 |
| 6,385,583 | B1 | * | 5/2002 | Ladd et al. | 704/270 |
| 6,386,453 | B1 | * | 5/2002 | Russell et al. | 235/462.01 |

\* cited by examiner

METHOD AND APPARATUS FOR ACCESSING ELECTRONIC DATA VIA A FAMILIAR PRINTED MEDIUM

CROSS REFERENCE TO RELATED APPLICATIONS

This application is a Continuation of application Ser. No. 09/365,961, filed Aug. 2, 1999, which is a continuation-in-part of application Ser. No. 08/628,246, filed Apr. 4, 1996, now U.S. Pat. No. 5,932,863, which is a division of application Ser. No. 08/250,799, filed May 25, 1994, now abandoned.

FIELD OF THE INVENTION

The present invention relates generally to the electronic media industry—such as cable television (CATV), home shopping services, on-line computer services, personal computer applications, and CD-ROM-based multi-media applications—and, more particularly, to a method and apparatus for allowing a user to access and make use of such electronic media services via a device that makes use of a standard book, magazine or other printed work.

BACKGROUND OF THE INVENTION

It is a well-known fact that a large fraction of the population is unfamiliar with the operation or use of modern computer devices. This remains true despite significant advances in user-interface technology—such as mouses, windows, menus and the like. It is commonly said that such technology makes computers "user friendly." However, the modern mouse/window/menu-based user-interface technology has been widely available for several years, and yet it still appears that this technology is not a panacea for computer-phobia. Indeed, studies have shown that a majority of VCR owners cannot operate the simple menu-based interface used to program their VCRs. Thus, there exists a great need for improved user-interface technology, if computer-based electronic media is to become as widely used and accepted as television or radio.

This need for improved user-interface technology will become even greater with the arrival of technology such as the presently planned "information superhighway," which will permit delivery of high-bandwidth (i.e., full-motion video rate) digital data into millions of homes via fiber optic, cable, RF, microwave or satellite links. Such technology will, in concept, permit instant delivery of a virtually limitless selection of commercial, informational, educational and entertainment programming at a user's request. However, without better user-interface technology, the average user may not be capable of enjoying the vast capabilities of such a system. Indeed, it is clear that the number of programming choices available to the user of such technology will be far greater than the number of choices involved in programming a VCR—a task already demonstrated to be too complicated for the average user of present-day user-interface technology.

In contrast to the difficulty many people encounter in using remote controls and other prior art computer interfaces, printed matter—such as books and magazines—represents an almost universally familiar and non-intimidating medium by which a user can acquire desired information. Even illiterate individuals incapable of reading text can nonetheless peruse pages of printed matter and appreciate the substance of flashy advertisements and the like. Thus, it would be highly desirable to provide a system with the information accessing capabilities of a modern CD-ROM or on-line computer system, and the user-interface simplicity of printed matter.

The prior art includes a class of devices known as "talking books"—see, e.g., U.S. Pat. No. 4,636,881 entitled TALKING BOOK WITH AN INFRARED DETECTOR USED TO DETECT PAGE TURNING, U.S. Pat. No. 4,702,573 entitled VISUAL AND AUDIBLE ACTIVATED WORK AND METHOD OF FORMING SAME, U.S. Pat. No. 4,778,391 entitled SOUND-PRODUCING AMUSEMENT OR EDUCATIONAL DEVICES, U.S. Pat. No. 4,809,246 entitled SOUND ILLUSTRATED BOOK HAVING PAGE INDICATOR CIRCUIT, U.S. Pat. No. 4,990,092 entitled TALKING BOOK and U.S. Pat. No. 5,209,665 entitled INTERACTIVE AUDIO VISUAL WORK, all of which are incorporated herein by reference. Typically, these "talking books" consist of a book with various sensors which—when activated by touching, page turning, etc.—cause a sound generating means (also embedded within the book) to produce or replay particular sounds. Talking books thus provide an interface for allowing an unsophisticated user (i.e., a child) to access a very primitive computer (i.e., the sound generating means embedded within the book) via familiar printed matter (i.e., the book with embedded sensors). Importantly, however, talking books do not provide a means for interfacing with modern electronic media—such as cable television (CATV), home shopping services, on-line computer services, CD-ROM-based multi-media applications, interactive TV or home computer applications.

One approach to interfacing with these modern electronic media is the "simulated book"—see, e.g., U.S. Pat. No. 4,855,725, entitled MICROPROCESSOR BASED SIMULATED BOOK, incorporated herein by reference. The "simulated book" is in essence a book-size intelligent graphics terminal. Unlike the talking books, the simulated book is not a self-contained system, but rather transmits commands to and receives data from a CD-ROM equipped personal computer via a wireless link. Thus, the programming that the simulated book can access is not limited to that which can be stored in embedded memory devices, as with the talking books. Importantly, however, the user-interface provided by the simulated book is essentially the conventional computer interface—i.e., keys, pointer, menus, etc. Therefore, a computer-phobic user will likely still find the simulated book intimidating and inaccessible.

A disadvantage of both the talking book and simulated book technologies is that both include relatively costly electronics—i.e., microprocessors, memory, display devices, etc.—as a part of the "book." Thus, these technologies cannot be effectively used to create a "throw-away" interactive magazine, newspaper or advertising brochure.

Thus, there remains a need for a method and apparatus for accessing the vast resources of electronic media using a device as familiar and non-intimidating as printed matter. There remains a further need for such a method and apparatus which utilizes a low cost, throw-away printed matter.

SUMMARY OF THE INVENTION

One object of the present invention is a method and apparatus for allowing a user to access electronic media via a printed matter.

Another object of the invention is a method and apparatus for allowing a user to access electronic media relating to, or expanding upon, material presented in the printed matter.

Another object of the invention is a low cost, throw-away printed matter useful in connection with other objects of the invention.

Still another object of the invention is an improved method of providing electronic media services.

Yet another object of the invention is an intelligent controller for use in connection with the invention.

In accordance with one embodiment, the invention comprises: (i) a printed matter having at least one sensor and a transmitter associated therewith; and (ii) an intelligent controller having a receiver and a means for accessing programming material. A user triggers said sensor through interaction with said printed matter, for example, by touching a particular spot on a page or by turning a page. In response to the triggering of said sensor, the transmitter sends a signal indicative of said sensor. The receiver receives said signal and, in response thereto, the intelligent controller executes a pre-programmed command related to accessing or controlling electronic media or programming. For example, when the user triggers a sensor associated with an advertisement in the printed matter, the intelligent controller may, in response, send a signal via a telephone line, cable connection, or wireless modem or cellular link to a remote video server, and thereby cause a promotional program to appear on the user's television.

In accordance with another embodiment, the invention comprises: (i) a printed matter having at least one machine-recognizable feature—such as a bar code or magnetic strip (or any commonly used printed indicia, such as a printed character, symbol or pictorial icon), (ii) a feature recognition unit having a means for recognizing said feature and a transmitter, and (iii) an intelligent controller having a receiver. The user directs the feature recognition unit to a feature on said printed matter. In response, said recognition unit transmits a signal indicative of the identity of the particular feature. The receiver receives said signal and the intelligent controller, in response thereto, executes an appropriate pre-programmed command.

In accordance with another embodiment, the invention comprises: (i) a printed matter having at least one machine-recognizable feature and (ii) an intelligent feature recognition unit having means for recognizing said feature, means for associating said recognized feature with a command, and means for issuing said command over a wireless link. In use, the user directs said intelligent feature recognition unit at a feature on said printed matter. In response, said intelligent recognition unit associates said feature with a pre-programmed command and issues a pre-programmed command sequence over a wireless data link to control or access electronic media services. The command may, for example, be transmitted—via an infrared (IR) or ultrasound link—to a CATV control box in the same room, or—via a cellular or satellite link—to the CATV company office.

In accordance with another embodiment, the invention comprises a printed matter having: (i) at least one sensor, (ii) a control module and (iii) a transmitter associated therewith. In response to the triggering of said sensor, said control module directs the transmitter to transmit a command related to accessing or controlling an electronic media service.

Other aspects of the invention relate to methods of providing, accessing or utilizing electronic media services. In accordance with one such aspect, the invention involves: (i) providing a printed matter having at least one sensor associated therewith, (ii) providing an intelligent controller which, in response to the triggering of said sensor, performs a pre-programmed command, and (iii) executing said pre-programmed command to access or control an electronic media.

Another aspect of the invention involves a method of providing electronic media services, which includes the steps of: (i) providing printed matter to a potential customer and (ii) pre-programming an intelligent controller to access or control an electronic media service in response to an event wherein the customer interacts with the printed matter in a particular manner. Advantageously, said printed matter comprises a low cost, throw-away publication.

In accordance with another aspect of the invention, an improved method of providing shop-at-home services includes the steps of: (i) providing to the customer a printed catalogue having at least one sensor or machine-recognizable feature associated therewith, (ii) programming a controller to execute a pre-programmed command in response to an event wherein the customer interacts with said sensor or feature, and (iii) providing a service—e.g., displaying promotional programming on the customer's television, contacting the customer by telephone, establishing a computer "chat" link, etc.—by telephone, cable, or wireless link in response to the execution of said command.

Another aspect of the present invention relates to an improved method of instruction, including the steps of: (i) providing an instructional printed matter—such as a textbook, cookbook, children's book or manual—having at least one sensor or machine-recognizable feature associated therewith, (ii) providing a means, distinct from said textbook or other printed matter, for executing a pre-programmed command in response to an event wherein a reader interacts with said sensor or feature, and (iii) in response to said command, causing or controlling: (a) the electronic delivery or presentation of information related to that in the textbook or other printed matter; and/or (b) the establishment of a communication link to a live tutor or consultant familiar with the subject matter contained in the instructional printed matter.

Another aspect of the invention relates to a low cost, throw-away printed matter—including at least one machine-recognizable feature—adapted for use in connection with the invention.

BRIEF DESCRIPTION OF THE DRAWINGS

The above—as well as other—aspects, objects and features of the present invention will be described in the Detailed Description below, which is intended to be read in conjunction with the following set of drawings, in which.

DETAILED DESCRIPTION OF THE PREFERRED EMBODIMENTS

In this section, the various preferred embodiments of the invention are described from two general perspectives. The first, a "functional" perspective, focuses on the contemplated interactions between the user and the various components—i.e., the printed matter, controller, display unit, etc.—of the invention. This functional description provides the insight needed to implement the software or firmware used in connection with the invention. The second perspective, the "apparatus" view, describes the various technologies that can be used to implement the individual components of the present invention.

The Functional Perspective

Figure 1:
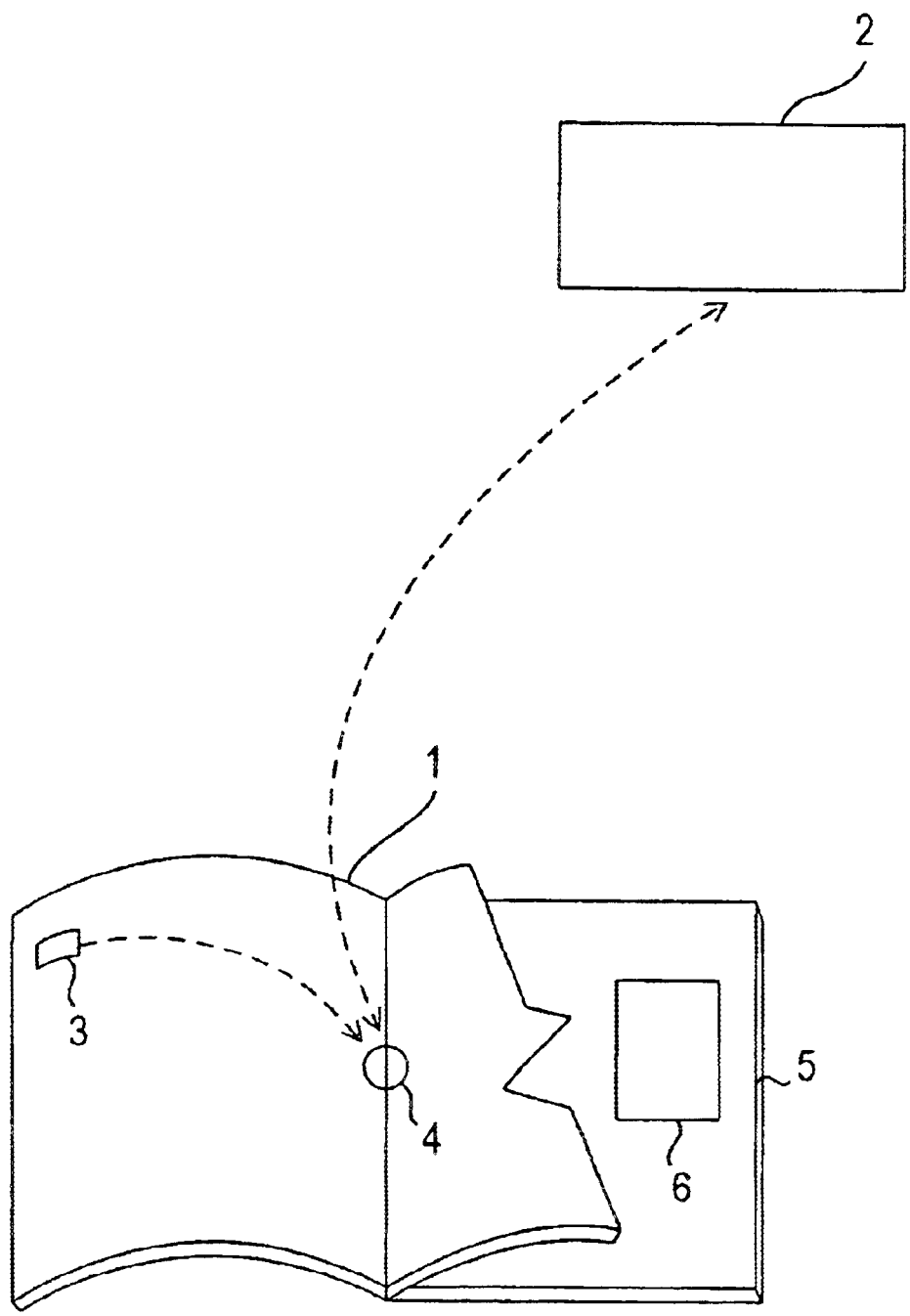
FIG. 1 depicts an embodiment wherein the display unit is embedded within the printed matter.
Figure 1A:
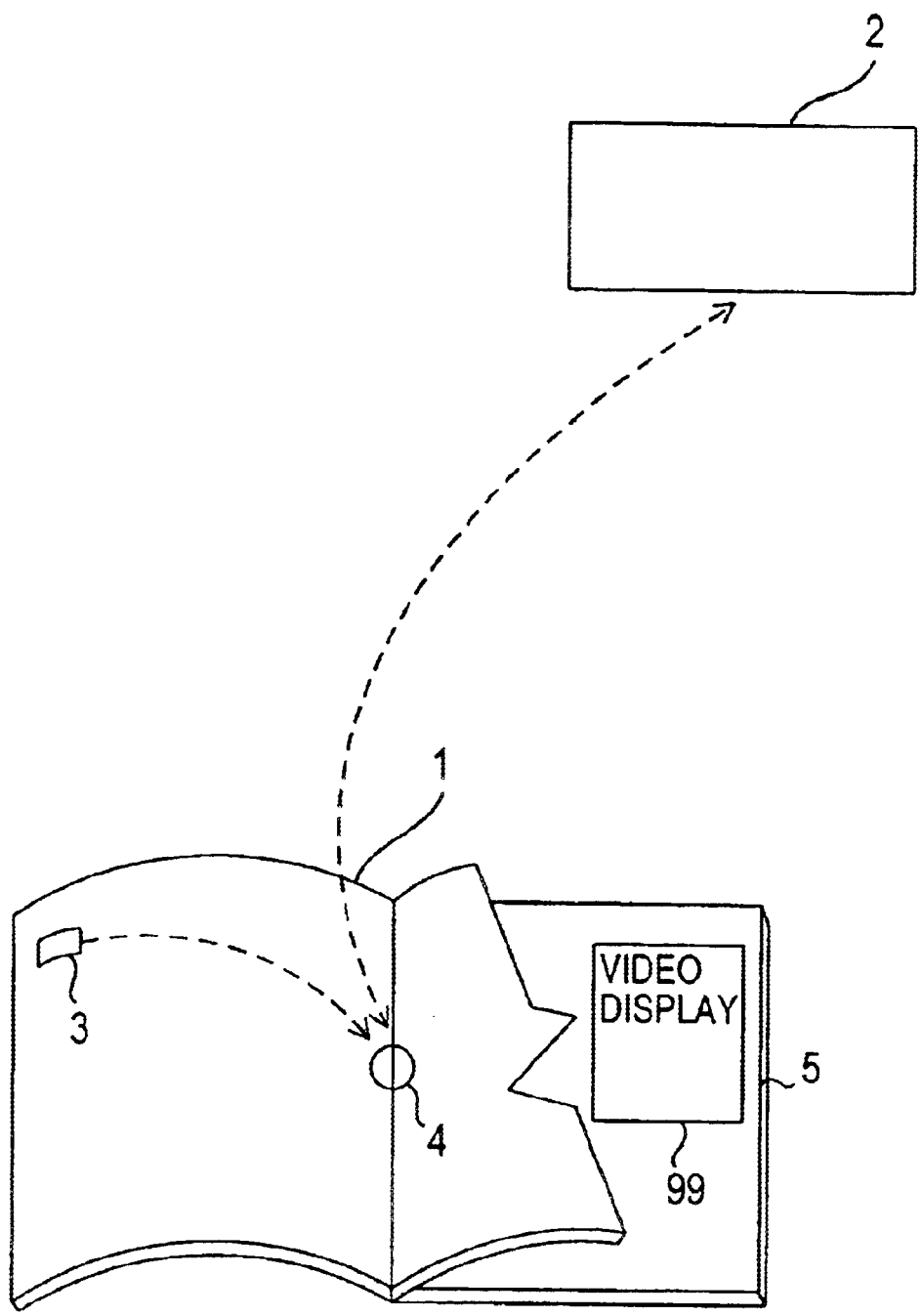

Reference is now made to FIG. 1, which depicts an embodiment of the invention comprising a printed matter 1 in communication (preferably wireless) with a data server 2. Printed matter 1 includes at least one sensor 3 and a controller, which preferably includes a microprocessor 4. A stiff or flexible page 5 (any page within a book) holds a display screen 6.

Printed matter 1 can take the form of a book, magazine, manual, musical score, catalog, advertisement, newspaper, telephone or electronic service directory, or other like means. The controller—including microprocessor 4—is preferably embedded within the spine or any other page of printed matter 1.

Display screen 6 can be an LED display, a passive or active matrix LCD display or other like means, and may also have an audio transducer associated therewith.

Sensor 3 is preferably touch sensitive, but can also be a page sensor or a combination of touch and page sensor, as described below. In response to a user's touch, microprocessor 4 causes programming material to be retrieved from data server 2 and displayed on screen 6. Data communication between server 2 and microprocessor 4 may operate via RF cellular, microwave, IR, optical, conductive, telephonic or CATV links, or any combination of these or other like means.

Figure 2:
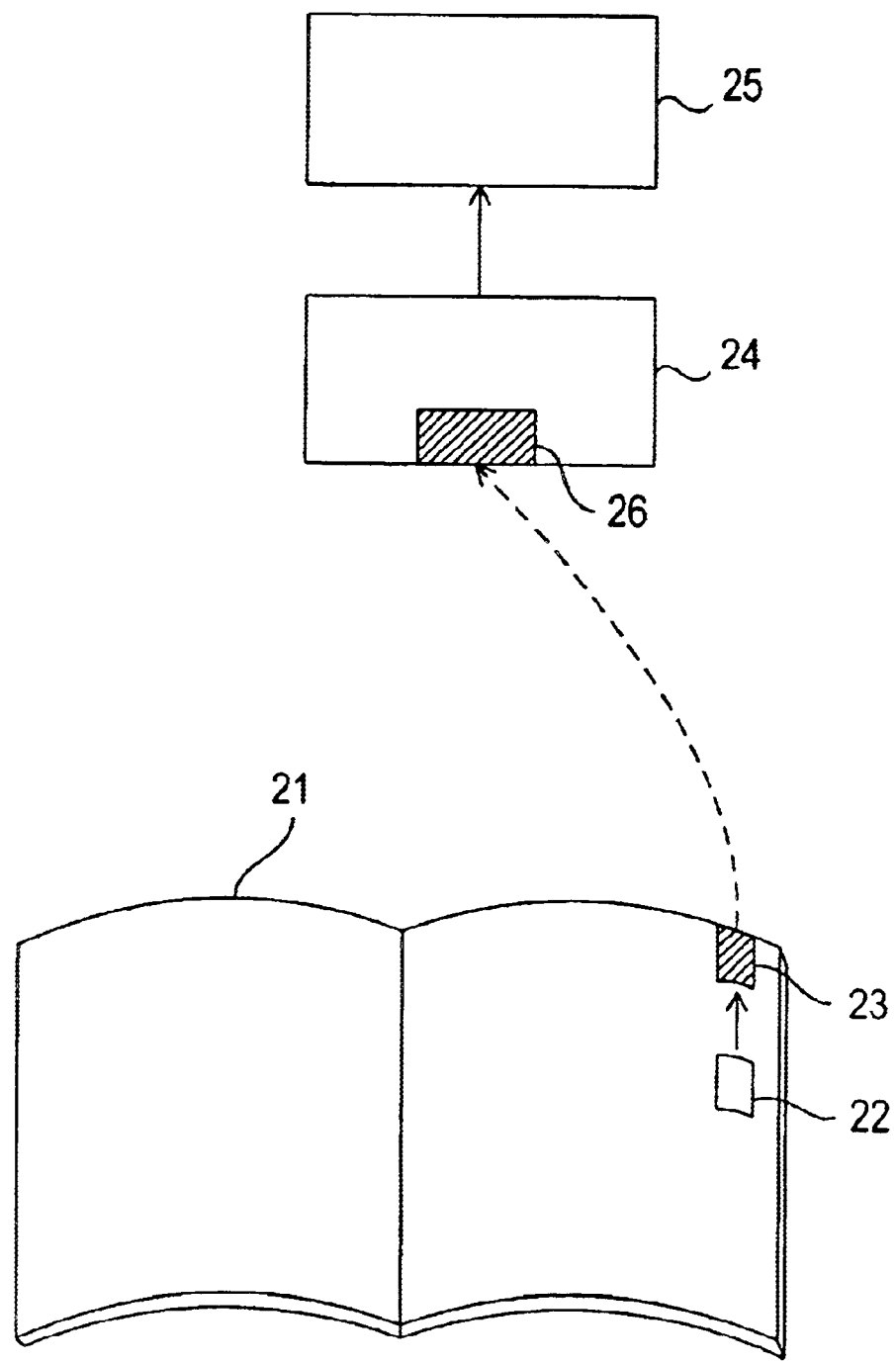
FIG. 2 depicts an embodiment of the invention wherein electronic media is presented on a user's TV set.

Reference is now made to FIG. 2, which depicts an alternative embodiment of the invention comprising a printed matter 21, an intelligent controller 24 and display unit 25. Printed matter 21 includes at least one sensor 22 and a transmitter 23. In response to a user's actuation of sensor 22, transmitter 23 transmits a coded signal indicative of the identity of the actuated sensor. A receiver 26 in intelligent controller 24 receives the coded signal. Controller 24 then identifies the actuated sensor, and initiates display of appropriate programming material on display unit 25 (which can be a TV set or any other means for audio or audiovisual presentation, including but not limited to a personal computer). Programming material preferably derives from a mass storage device—e.g., a magnetic disk, CD-ROM, ROM, flash RAM, PCMCIA card or other memory means—associated with intelligent controller 24 (or with display unit 25). As used herein, the term "memory means" shall also include future storage technologies, such as the recently announced multi-layer CD-ROMs being developed by IBM. See "New I.B.M. Laser Method Stacks Data on Disks," New York Times, May 13, 1994.

Figure 3:
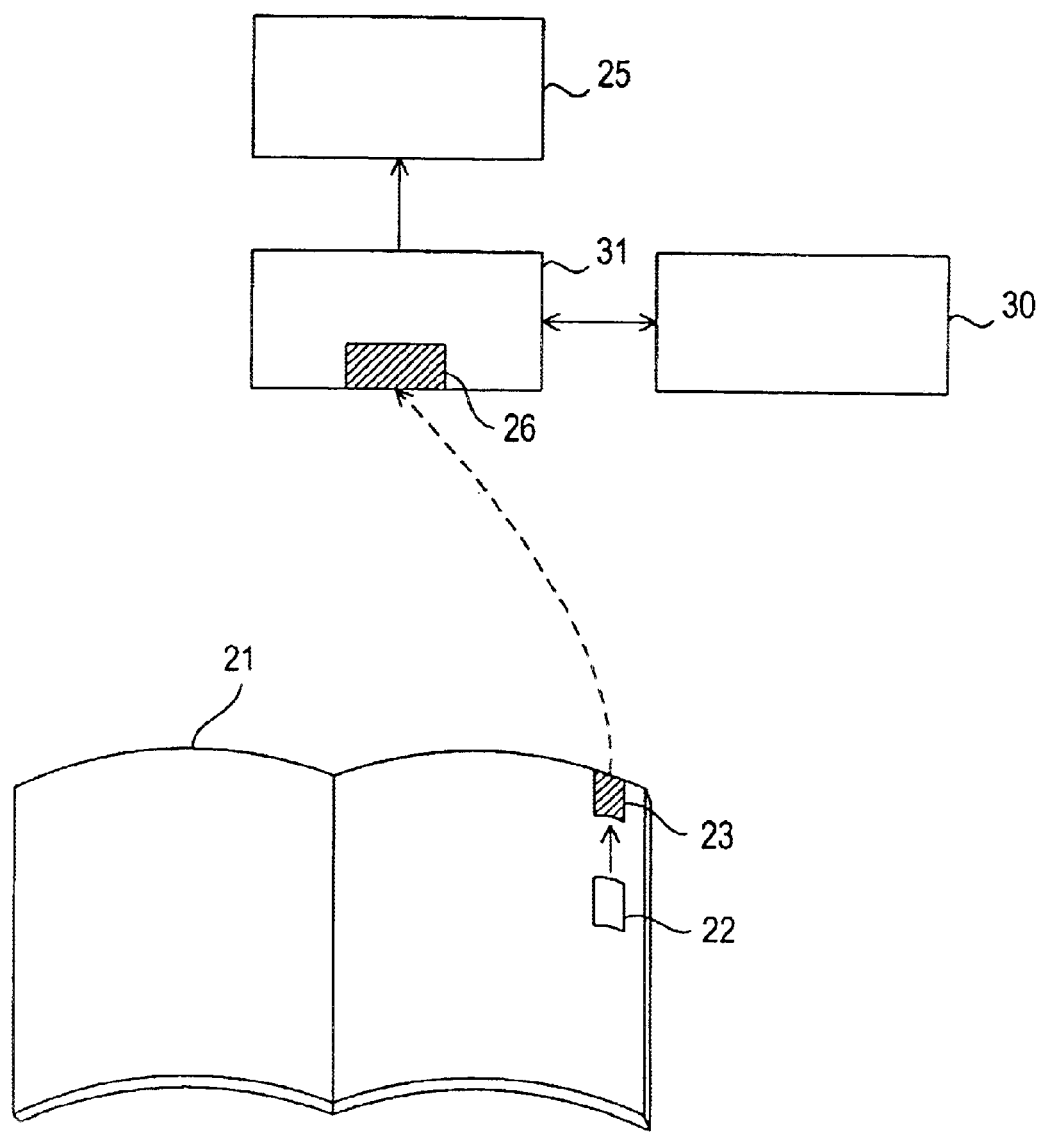
FIG. 3 depicts an embodiment of the invention wherein programming material is accessed from a remote source.

Reference is now made to FIG. 3, which depicts an embodiment of the invention in which intelligent controller 31 derives programming material from a remote server 30. Controller 31 includes means for accessing a remote server 30 of programming material, and preferably further includes means for decompressing compressed programming material received from server 30. In response to a coded signal received by receiver 26, intelligent controller 31 sends an appropriate command to server 30 to select and initiate transfer of appropriate programming material. Controller 31 then receives programming material from remote server 30 and prepares (e.g., decompresses, if necessary) the material for presentation on display unit 25. As with conventional pay-per-view CATV services and on-line computer services, the user is billed according to the volume and/or nature of programming material requested.

Figure 4:
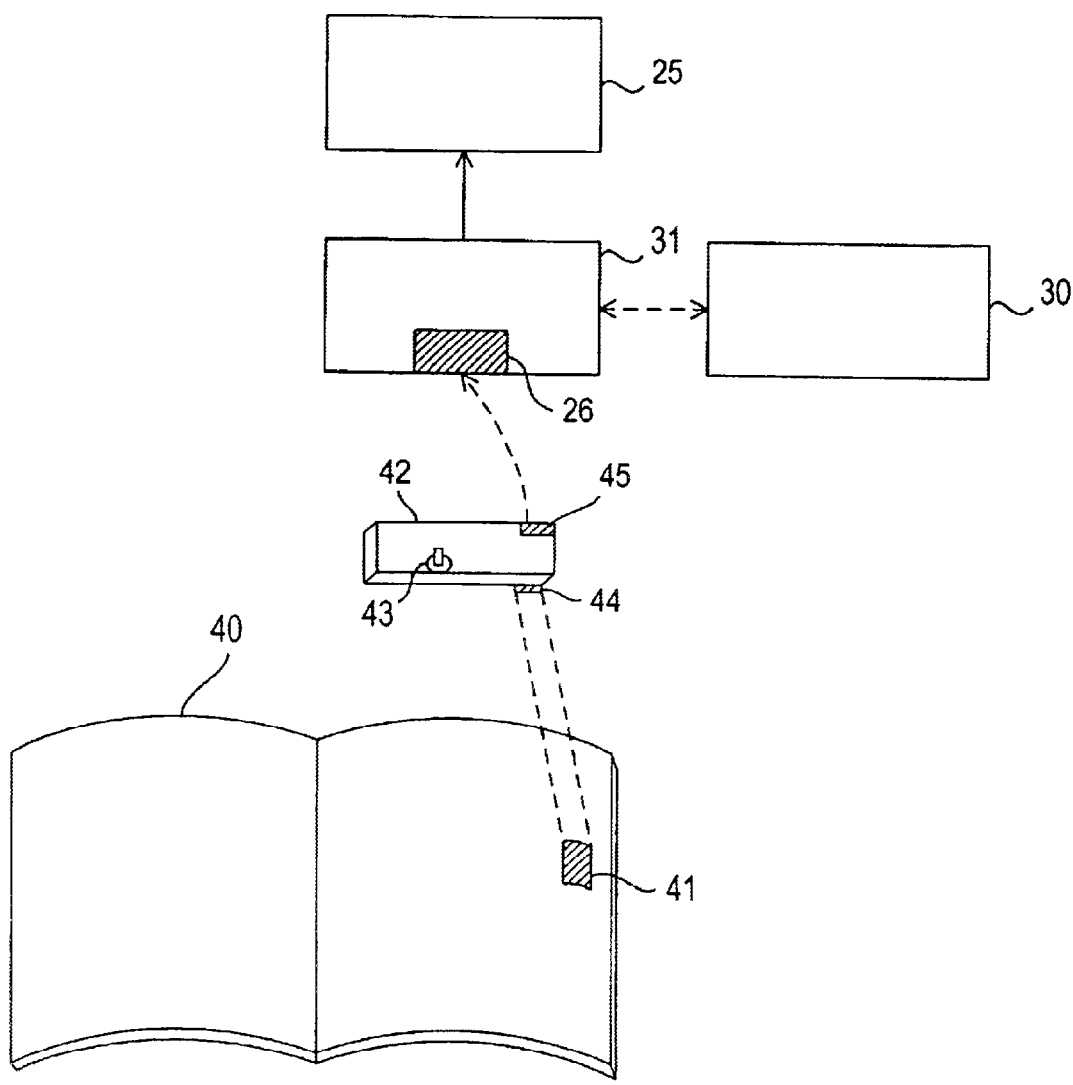
FIG. 4 depicts an embodiment of the invention which includes a feature recognition unit.

Reference is now made to FIG. 4, which depicts an embodiment of the invention including a printed matter 40, a feature recognition unit 42, an intelligent controller 31, a server 30 and a display unit 25. Printed matter 40 includes at least one machine-recognizable feature 41 in the printed work, such as a bar code, invisible bar code, magnetic code, printed character, symbol or pictorial icon, or other feature.

Feature recognition unit 42 is a hand-held device and includes means 44 for recognizing feature 41, a transmitter 45 and an optional user actuation switch 43. The user directs recognition unit 42 at a feature and depresses actuation switch 43. In response thereto, means 44 for recognizing "reads" (i.e., for a printed feature, scans and identifies) the feature 41, and transmitter 45 transmits a coded signal indicative of the identity of feature 41. The operation of controller 31, server 30 and display unit 25 is otherwise identical or similar to the FIG. 3 embodiment.

Still referring to FIG. 4, use of embedded features 41—as opposed to sensors—lowers the fabrication cost of printed matter 40. Advantageously, printed matter 40 can be a low cost, throw-away publication.

An identification code generated either by recognition unit 42 or intelligent controller 31 allows the user to be billed for his/her use of transmitted material by server 30 and, for commercial applications, allows the advertiser to identify the potential customer.

Figure 4A:
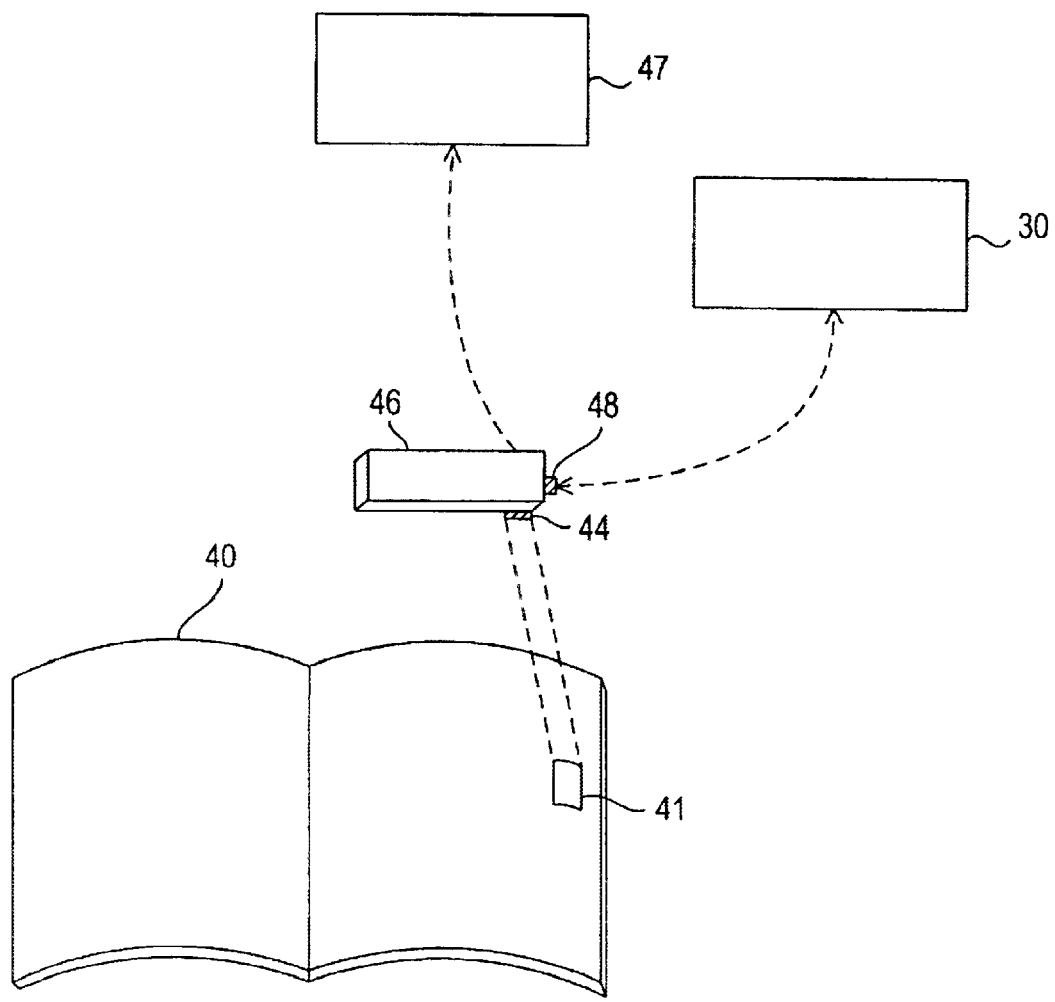
FIG. 4a depicts an embodiment of the invention wherein the feature recognition unit provides an interface between the display unit and a remote source of programming material.

Reference is now made to FIG. 4a, which depicts an embodiment of the invention in which the functions of the intelligent controller are integrated into a recognition/control unit 46. Unit 46 includes means 44 for recognizing feature 41 and means 48 for accessing—preferably via a cellular RF link—programming material associated with server 30. In addition, recognition/control unit 46 optionally includes a microprocessor. Either recognition/control unit 46 or display unit 47 may include means for decompressing compressed programming material.

Figure 5:
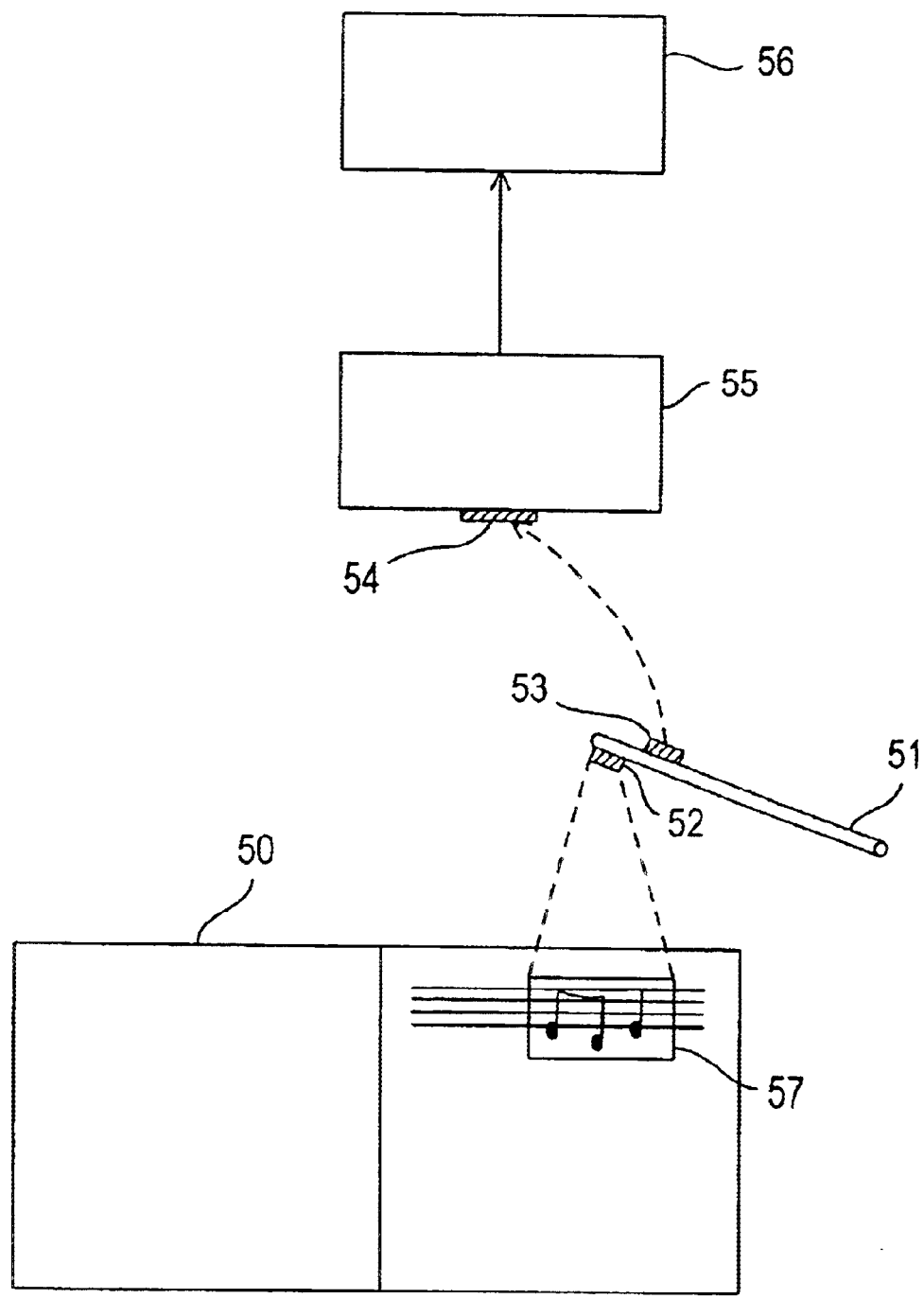
FIG. 5 depicts an embodiment of the invention adapted for presentation of musical programming.

Reference is now made to FIG. 5, which depicts an embodiment of the invention adapted for musical applications. The embodiment includes a printed musical score 50, an electronic baton 51, a music controller 55 and an audio/audiovisual player 56. Using baton 51, the user directs a recognition means 52—which can be either a CCD camera or a magnetic detector—at a particular portion 57 of printed score 50. Transmitter 53 then transmits a coded signal indicative of the selected portion 57. Music controller 55, in response to the coded signal, directs the presentation of appropriate audio or audiovisual programming on player 56. Music controller 55 may include a means for storing programming material—such as ROM, CD-ROM, flash RAM, PCMCIA card or other memory means—or an electronic musical synthesizer, or both.

Figure 5A:
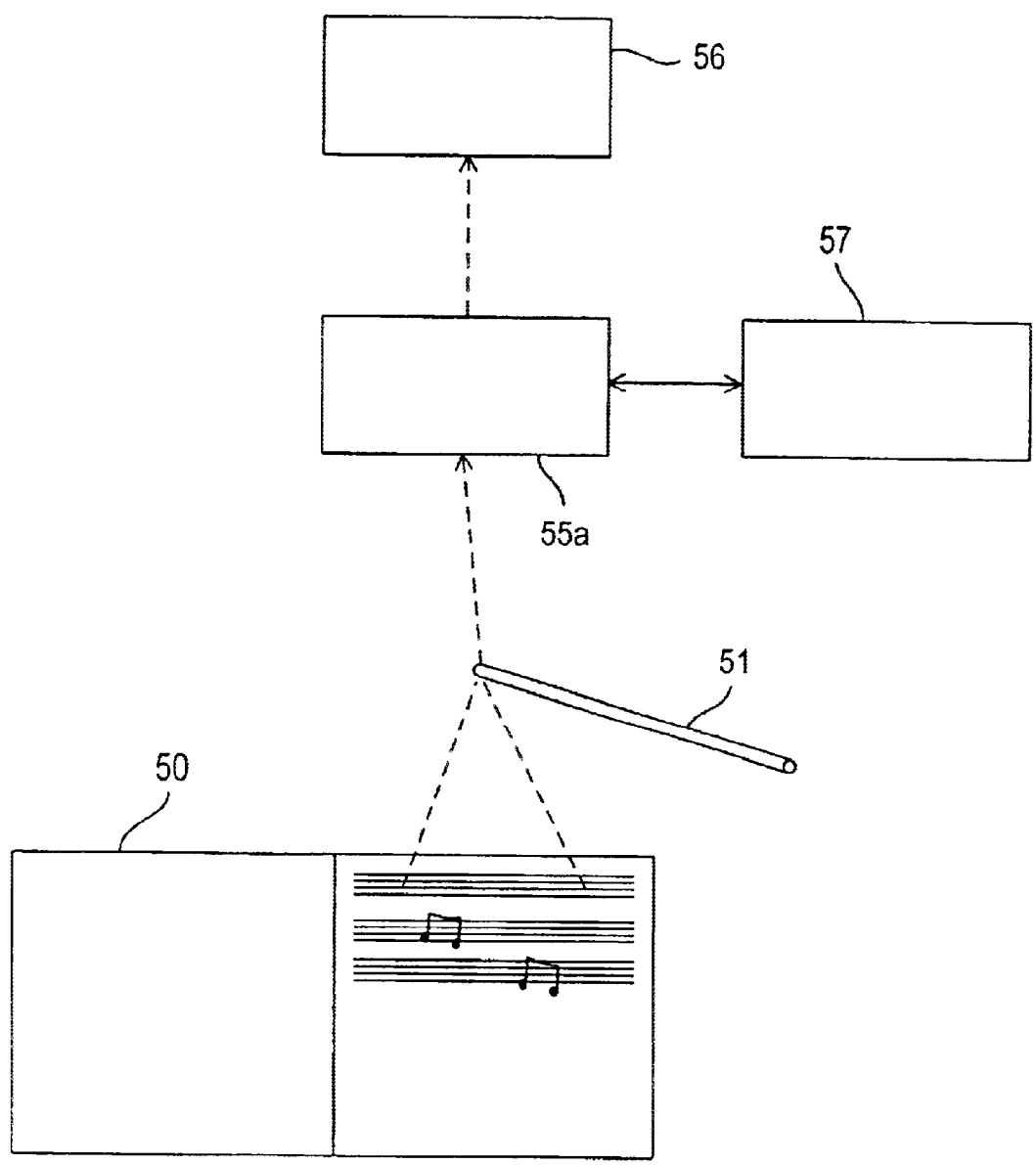
FIG. 5a depicts an alternative embodiment of the invention adapted for presentation of musical programming.

Reference is now made to FIG. 5a, which depicts an alternative embodiment of the invention directed to musical applications. In FIG. 5a, music controller 55a retrieves programming material from a remote data server 57. Using a remote server permits continuous updating of programming material, such as replacing one performance or opera company with another. Either player 56 or controller 55a preferably includes means for decompressing compressed programming material received from server 57.

Figure 6:
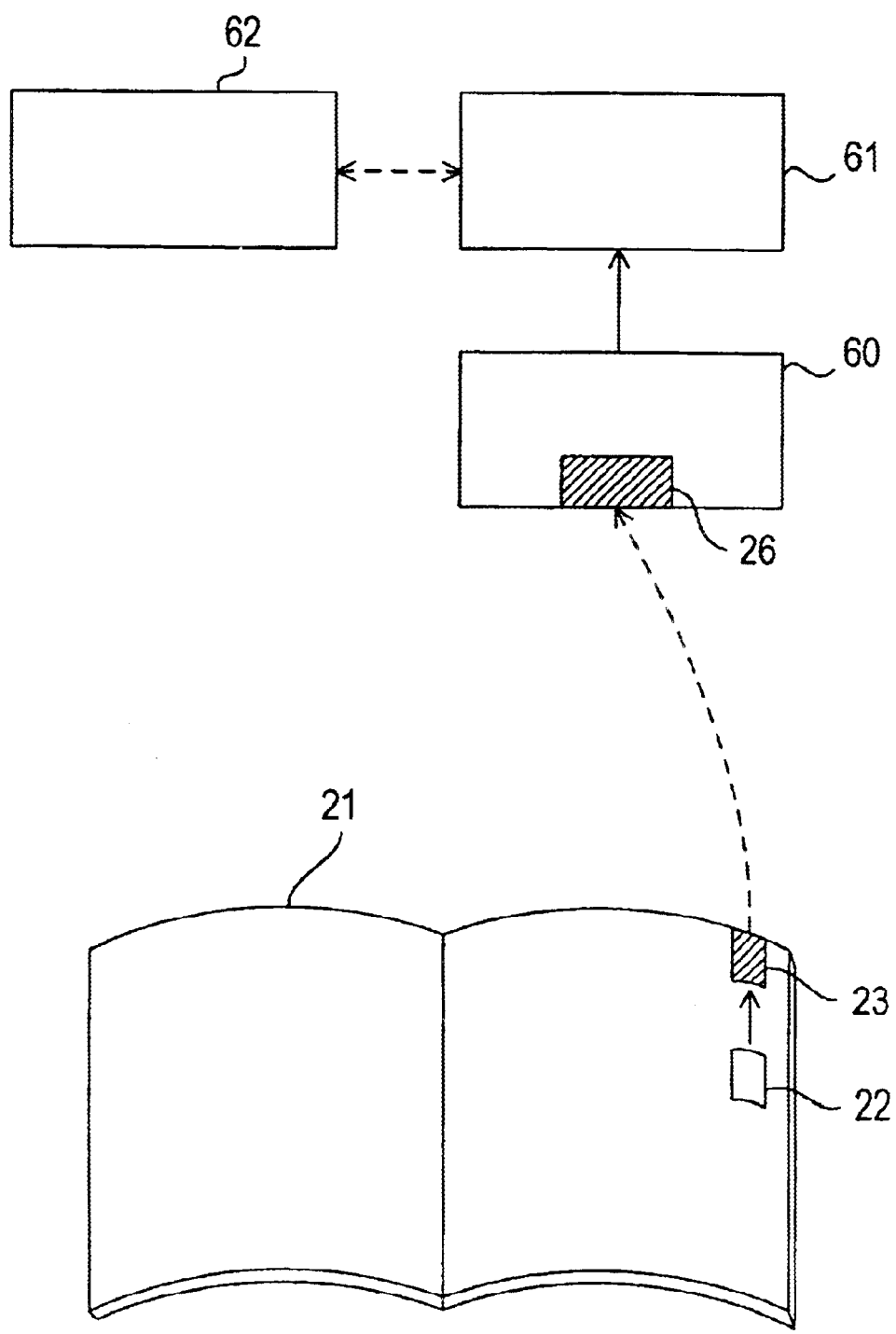
FIG. 6 depicts an embodiment of the invention wherein the display unit comprises a personal computer.

Reference is now made to FIG. 6, which depicts an embodiment of the invention utilizing a personal computer to access and display electronic programming material. In this embodiment, portions of the personal computer provide the functions of the previously-described intelligent controller, while other portions of the computer provide the functions of the display unit. The scope of this invention should not be limited to the traditional notions of Personal Computers. The present invention will find use in conjunction with more non-traditional applications such as WEB-TV®, Video Phones, as well as other chip based technologies. An interface unit 60 includes a receiver 26 for receiving a coded signal from a transmitter 23, representative of an actuated sensor 22 (or, in an alternative embodiment which includes a feature recognition unit, from the feature recognition unit indicative of the selected feature) on printed matter 21. Interface unit 60 connects to personal computer 61 by any conventional means, such as an I/O port, card slot, etc. Personal computer 61 monitors the interface unit 60, and displays (or controls the display of) appropriate programming material selected by the user through his/her interaction with printed matter 21.

Programming material can be stored on personal computer 61—on a ROM, CD-ROM, flash RAM, PCMCIA card, or other disk/card supplied along with printed matter 21—or accessed from a remote data server 62.

Figure 6A:
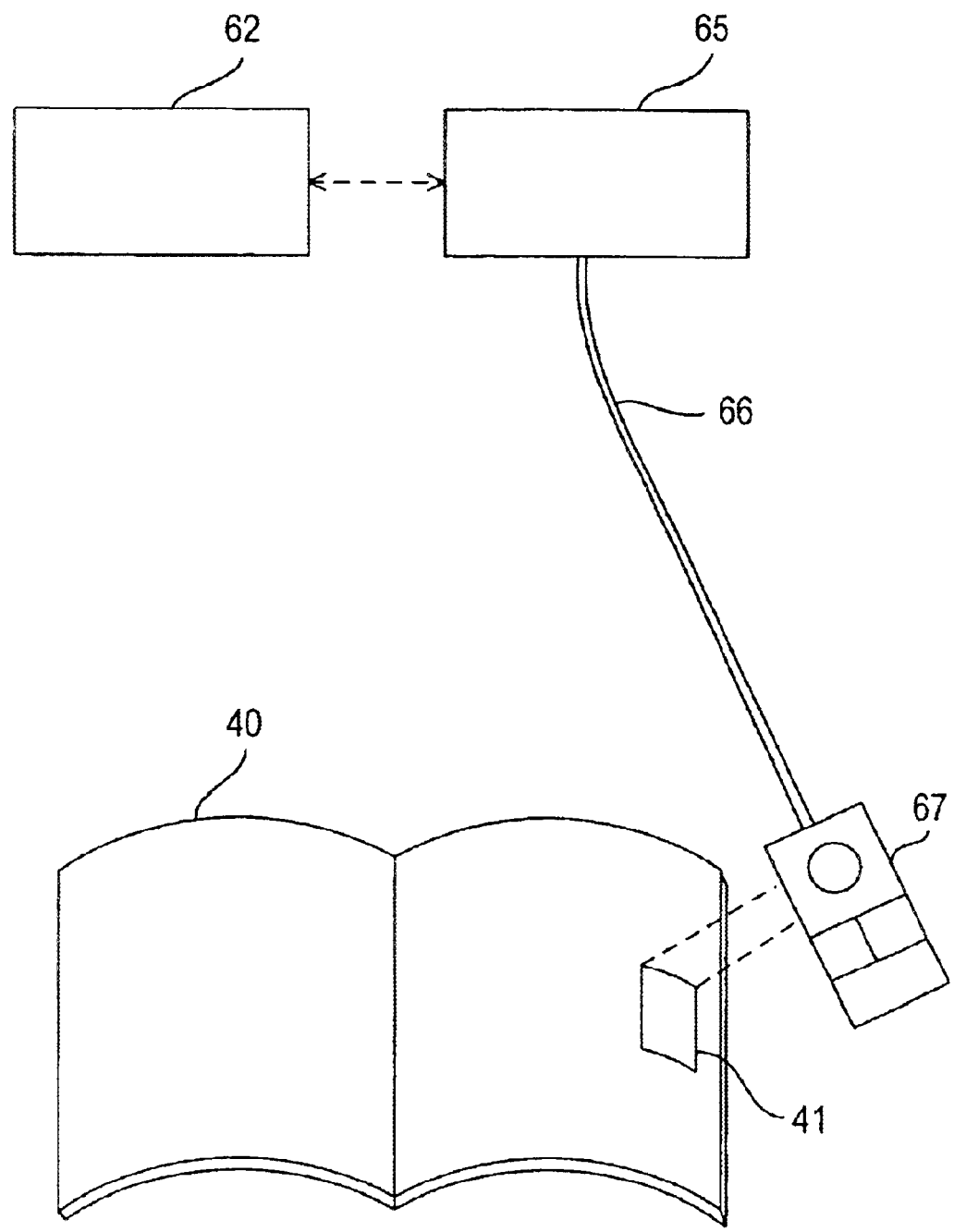
FIG. 6a depicts an embodiment of the invention wherein the user employs a hand-held scanner/pointer device to select features associated with a printed matter and to interface with an intelligent controller or personal computer.

Reference is now made to FIG. 6a, which shows an embodiment of the invention wherein a user employs a hand-held recognition device 67 to: (i) select programming material associated with a feature 41 on a printed matter 40; and (ii) control or interact with a personal computer 65 during the presentation and/or execution of the programming material. The recognition device 67 may be comprised of one of many possible devices already in use within the computer and electronics industry.

The prefered embodiment may utilize a scanner/mouse which is described in detail in U.S. Pat. No. 4,804,949, entitled HAND-HAND-HELD OPTICAL SCANNER AND COMPUTER MOUSE, which is incorporated herein by reference. The FIG. 6a embodiment provides at least two modes of interaction for the use of the Scanner/Mouse:

(i) Scan Mode:
  In this mode, scanner/mouse 67 operates as a scanner. The user points scanner/mouse 67 at a feature 41 in a printed matter 40 and depresses a switch to cause the feature to be scanned. Personal computer 65 receives the scanned image, decodes it, and executes a pre-programmed command in response. Execution of the pre-programmed command may, for example, cause personal computer 65 to fetch an interactive software program from a centralized data bank 62, and begin execution of the fetched software. Once the fetched software begins executing, scanner/mouse 67 may be placed into mouse/trackball mode, in order to support interaction between the user and personal computer 65.

(ii) Mouse/Trackball Mode:
  In this mode, scanner/mouse 67 operates as a normal X-Y movement sensor, such as a mouse or trackball. Thus, this mode is useful to control conventional graphical interface functions, such as menus, windows, icons, cursors, video games, etc. Those skilled in the art will appreciate that this mode can provide any or all features typically found in modern graphical user interfaces.

Figure 6B:
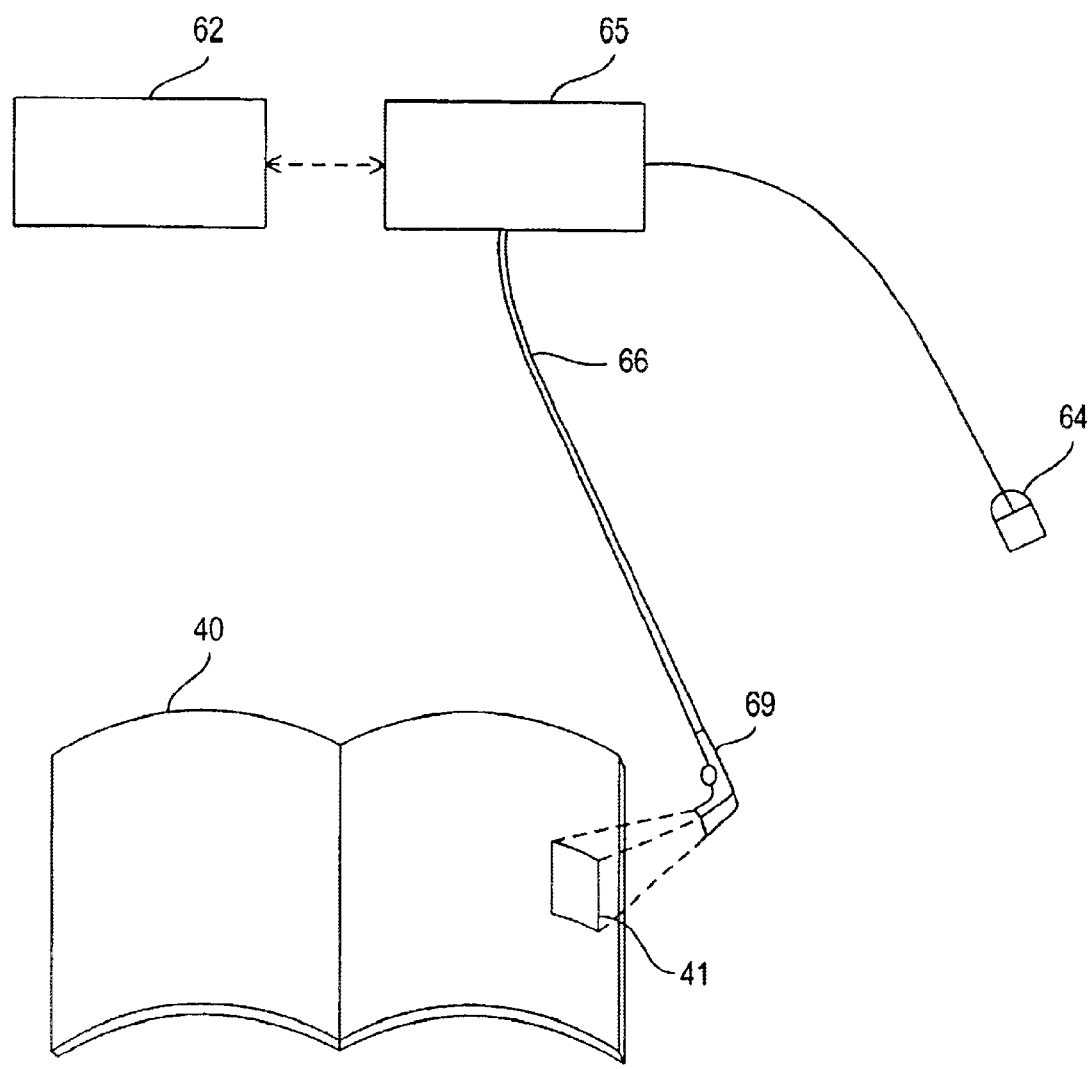
FIG. 6b depicts an alternative embodiment of the invention wherein the user employs a separately attached trackball mouse and hand-held scanner device to select features associated with a printed matter and to interface with an intelligent controller or personal computer.

The scanning function of the mouse may in the alternative be accomplished by the utilization of a bar code or other symbol laser scanning device incorporated within the hand-held unit 67. This invention is commonly used in grocery stores, and automated warehousing applications to price, and inventory goods. These scanners may be manufactured as a single unit with the trackball mouse of the PC 65 or alternatively may be employed as a separate device 69 with separately attached trackball mouse 64 as shown in FIG. 6b. As described in greater detail in U.S. Pat. No. 4,387,297, entitled PORTABLE LASER SCANNING SYSTEM AND SCANNING METHODS, these laser scanning devices 69 have a trigger within the device which initiates a repetitive scanning of each object bearing a symbol 41, and an indicator displays when the reading of that particular object has been completed. The recognition of the symbol 41 is accomplished by the generation of a miniature light beam from the unit which is reflected in varying intensity depending on the qualities of the symbol 41. A sensing means within the unit detects the intensity of the light reflected from the symbol 41. The detecting means then generates an electrical signal indicative of the detected intensity of the light. A signal processing means then interprets the electrical signals to generate data descriptive of the symbol. The printed matter 40 would be affixed with bar codes or other symbols 41 which could be read with the laser scanning device 69. The user would be directed to place the scanning portion of the device upon the symbol 41 and depress the trigger at appropriate times while reading or viewing the printed matter 40. The symbol 41 once scanned and processed would deliver a corresponding digital command, or reference to the software of the PC 65 working in coordination with the scanning device 69.

Figure 6C:
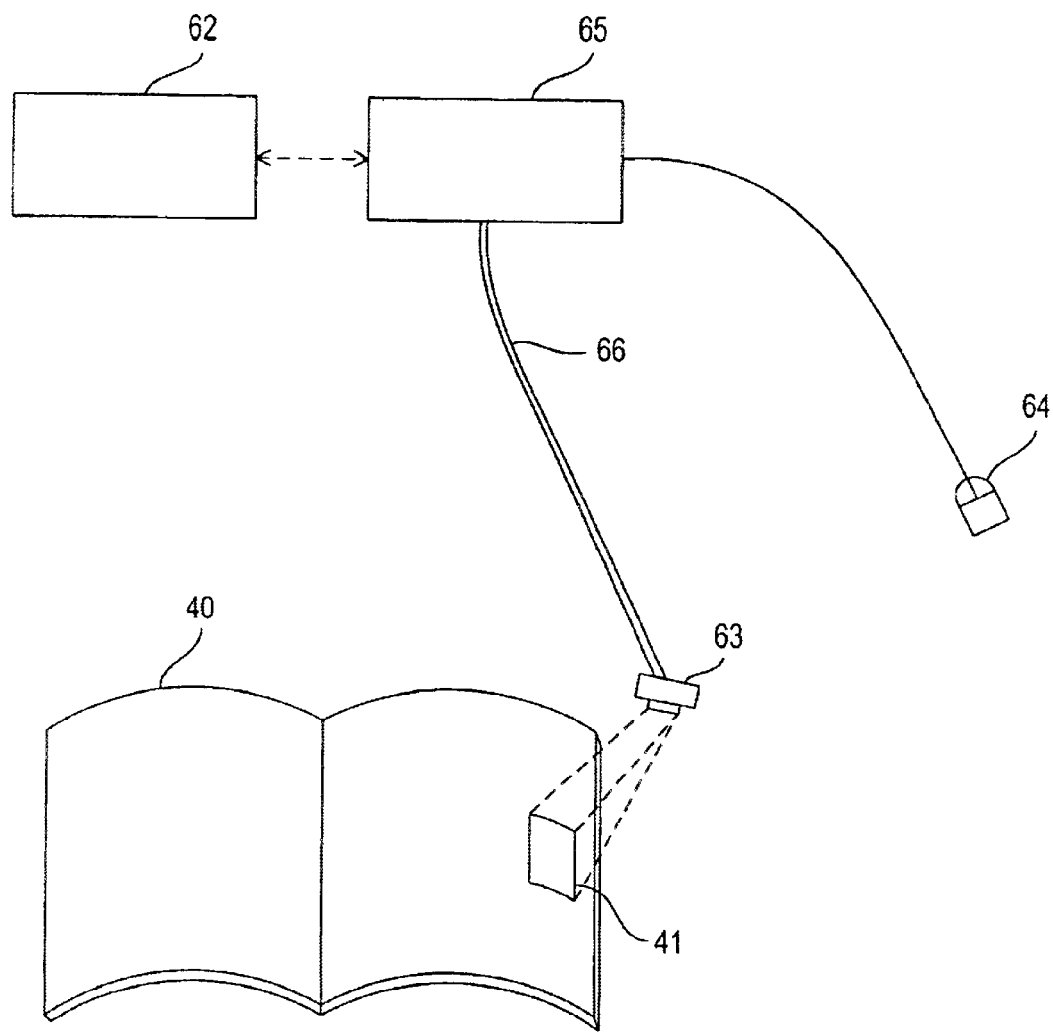
FIG. 6c depicts another embodiment of the invention wherein the user employs a separately attached trackball mouse and digital camera device to select features associated with a printed matter and to interface with an intelligent controller or personal computer.

An additional peripheral device which may be employed to recognize symbols could be the digital camera 63 shown in FIG. 6c. The digital camera 63 has gained popularity over recent years, and would have the advantage in this application of already being available to consumers who have either purchased it for its picture quality digital images, or for those who would be interested in the cameras multi-functional use including this application. The digital camera 63 employs solid state sensing devices such as a charged coupled device to record images. The optical images which are recorded are then converted to discreet electric signals, which are then stored in various memory devices. The images may then be recalled from the memory device to be displayed, printed, or otherwise manipulated. One of the applications of the digital camera 63 is in the downloading of digital images to personal computers 65. The digital camera 63 could therefore be used to download images of symbols 41 within reading materials 40 to the user's PC 65. Symbol processing software on the PC 65 could then interpret symbols downloaded from the digital camera 63 or its memory, and the PC 65 program's code logic would thereby trigger corresponding functions of PC 65.

Figure 6D:
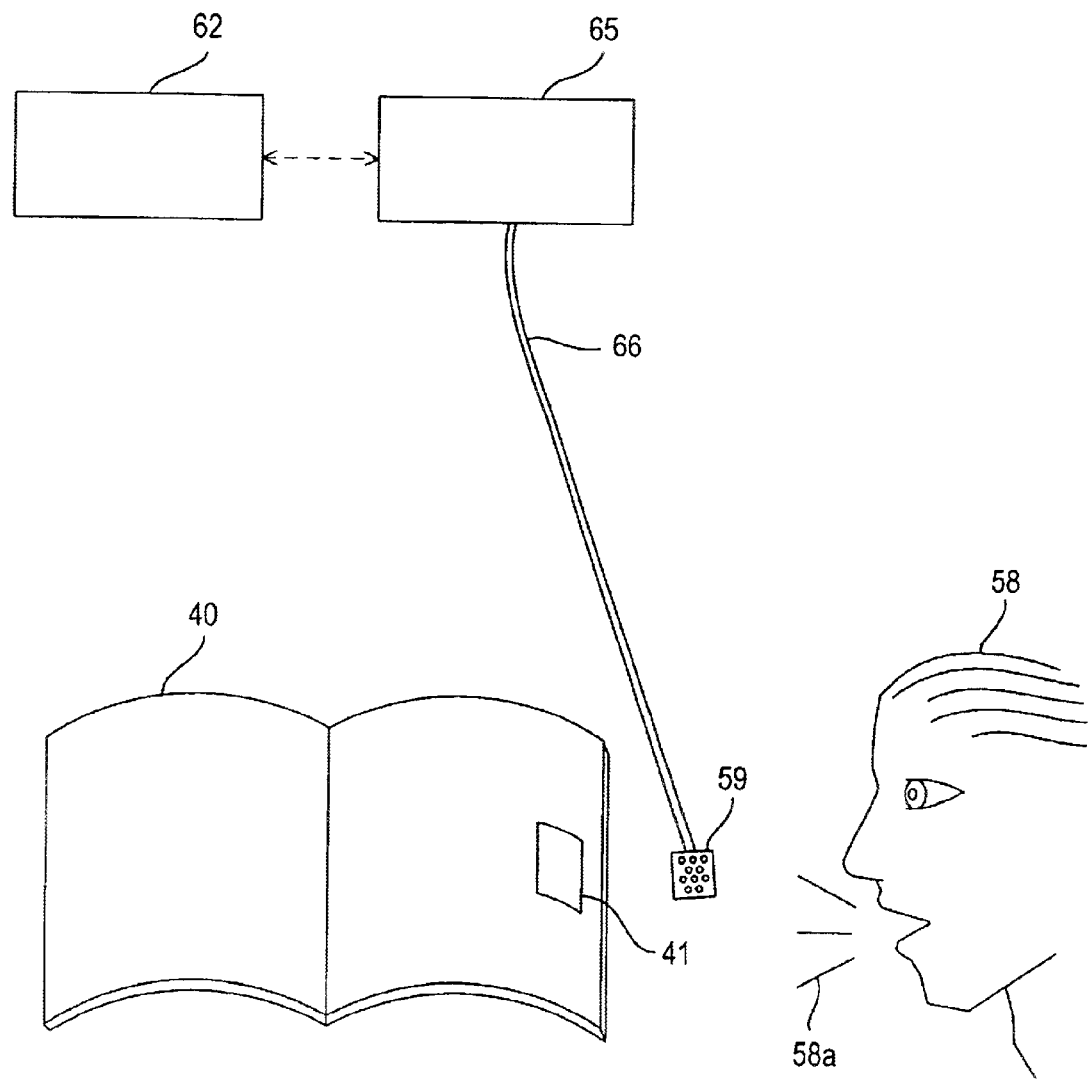
FIG. 6d depicts another embodiment of the invention wherein the user employs a microphone set up to interface with an intelligent controller or personal computer which contains voice recognition software to select features associated with a printed matter.

The triggering of the functions of PC 65 could also be initialized by verbal commands 58a from the user 58, as shown in FIG. 6d. The PC 65 could be affixed with a microphone 59. As the user 58 reads or works with a printed material 40 she could be instructed to pronounce verbal commands 58a into the microphone 59 by feature 41 in the printed matter 40. The PC 65 would then have voice recognition software which would interpret the verbal commands 58a from the printed matter 40 to access the programing material by, for example running applications which correspond with the commands.

Figure 6E:
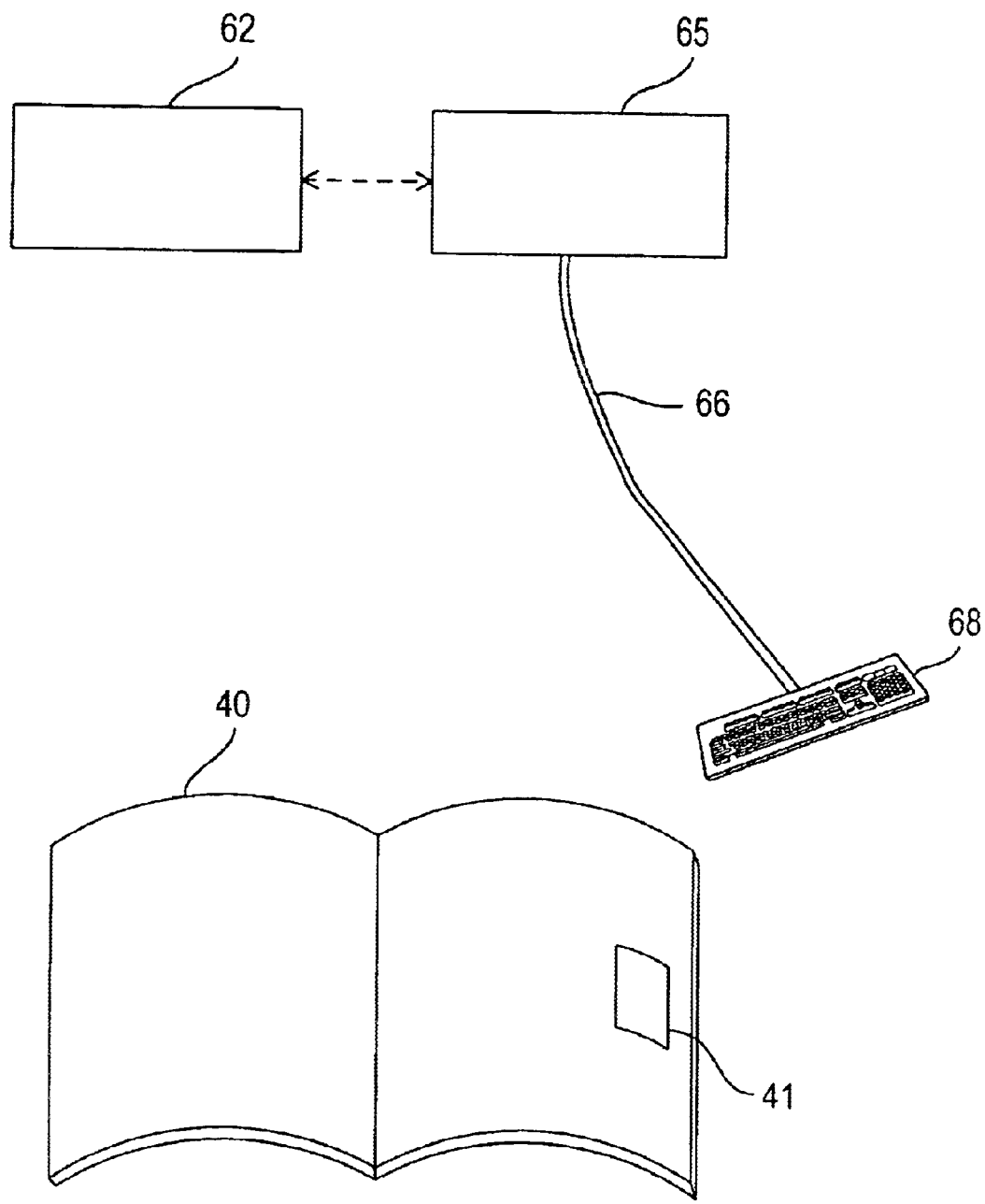
FIG. 6e depicts yet another embodiment of the invention wherein the user employs a traditional keyboard set up to interface with an intelligent controller or personal computer for manual entry to select features associated with a printed matter.

In yet another alternative embodiment of the invention the feature 41 of printed matter 40 could also be manually entered into the PC 65 by way of a traditional keyboard 68 shown in FIG. 6e. Users of the printed matter 40 who, for example, are reading advertisements, or working through a tutorial would be directed to manually input codes or word commands (feature 41) into the PC 65 by way of a keyboard 68. The command would then, similar to other sensing devices, initialize a program or PC function which would operate in concert with the printed matter 40.

In each of the configurations of this invention described in FIGS. 6a–6f, PC applications may be retrieved from PC interfaces 62 such as CD ROM drives, hard drives, PCMCIA cards, Flash RAM, web interfaces, or any other addressable memory device which the PC has access too.

Figure 6F:
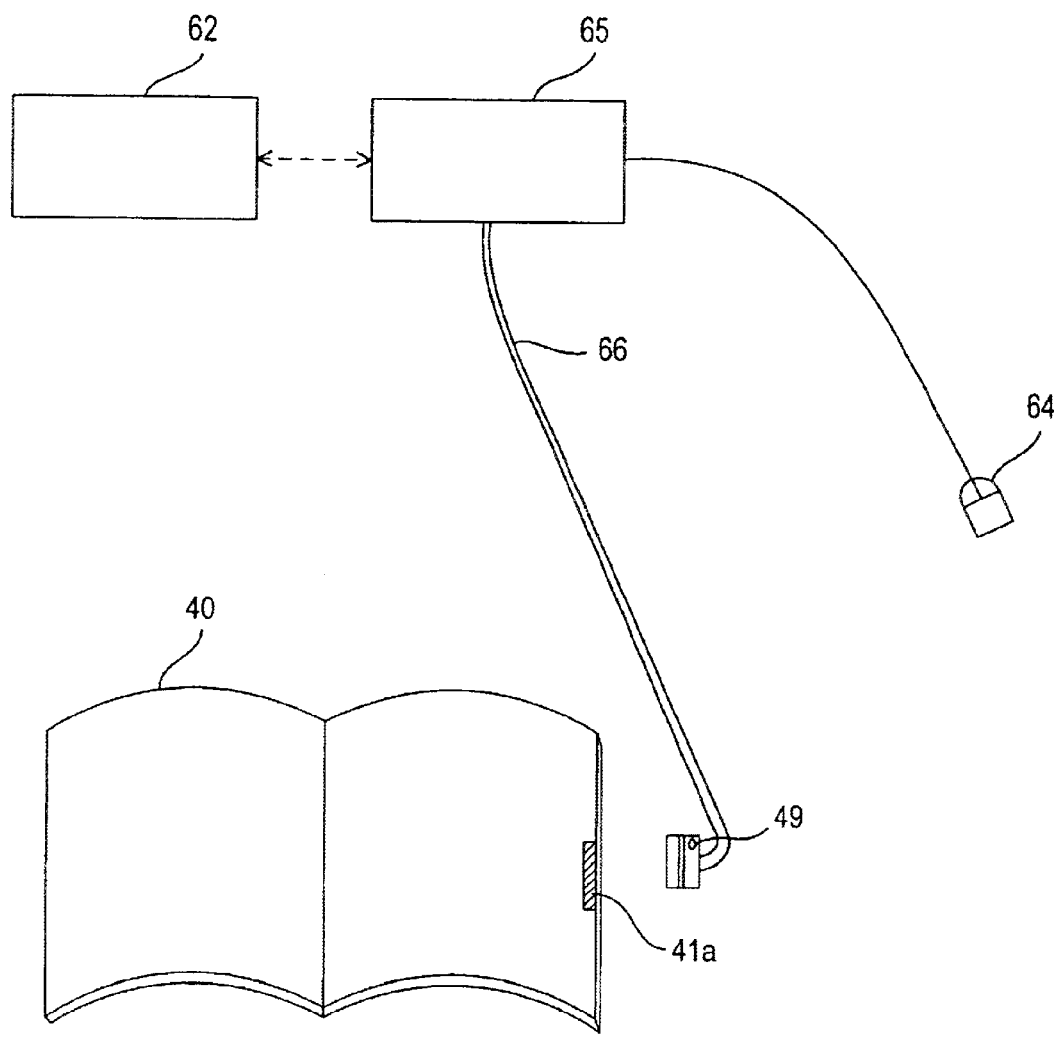
FIG. 6f depicts another embodiment of the present invention in which a scanable magnetic strip is set up to interface with an intelligent controller or personal computer equipped with a magnetic card reader to select features associated with a printed matter.

The coded information might also be transferred to the computer through a scanable magnetic strip 41a as shown in FIG. 6f. Known magnetic strip technology, used such as that credit and debit cards, has information as fixed electronic data embedded on the surface of the card. The PC 65 will have a magnetic card reader 49 connected to one of its external ports. The printed matter 40 will direct the user to read the magnetic strip 41a into the reader 49. The information embedded on the magnetic strip will provide commands to the PC 65 to access programing material by directing currently running applications, or to retrieve and run applications from remote or local sources.

Data collected from the sensing device(s) in the form of digital images or translated to a decoded command may by transferred to the PC 65 via a METHOD AND SYSTEM OF BI-DIRECTIONAL PARALLEL PORT DATA TRANSFER BETWEEN DATA PROCESSING SYSTEMS as described in detail in U.S. Pat. No. 5,600,793. This process transfers discreet packets of data both to and from peripheral devices. These devices would be in constant communication, allowing both the sensing device as well as the PC 65 to send and receive data. Alternatively the data may be transferred via infra red, microwave or some other light frequency data transfer method. The user might also desire that the sensing device be manufactured in kind with the traditional television remote control device. This would re-enforce the desirability of the unit being manufactured in a wireless unit with a light emitting data transfer method as described above. This advantage would of course be balanced with the cost effectiveness of the design, as well as the reliability of the data transfer via either method.

Figure 7:
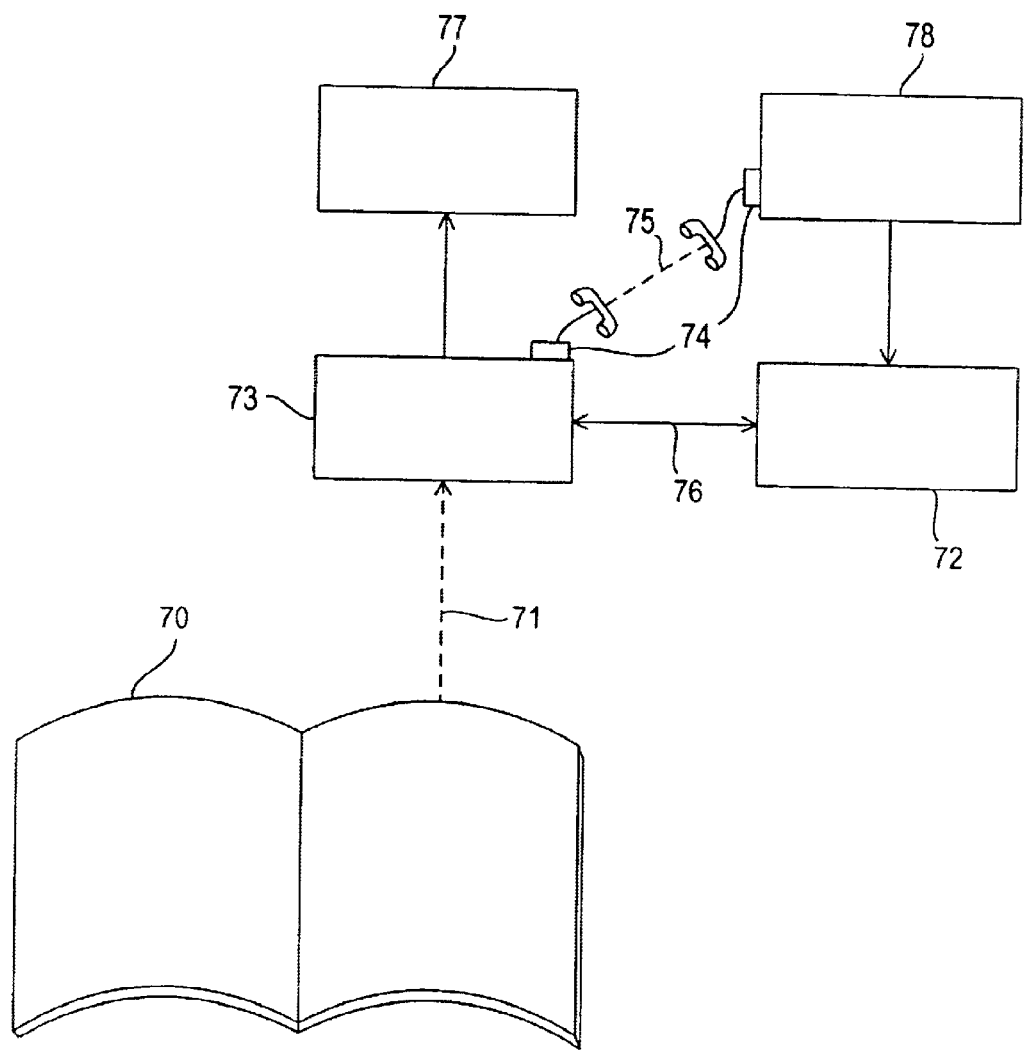
FIG. 7 depicts an embodiment of the invention adapted for shop-at-home applications.

Reference is now made to FIG. 7, which depicts an embodiment of the invention adapted for commercial and shop-at-home applications. The customer views and interacts with a printed matter 70 (via sensors or a feature recognition units, both as previously described). Printed matter 70 is preferably a throw-away catalog or advertising brochure listing commercial items, such as programming choices, merchandise, travel or event schedules, or television and/or radio programming schedules. The user interacts with printed matter 70 (i.e., with certain features and/or sensors therein) to cause a coded signal 71 indicative of the customer's selection to be transmitted (either by a transmitter embedded in the printed matter or within a feature recognition unit) to controller 73. In response thereto, controller 73 utilizes a modem/telephone (or other wired or wireless communication) link 74–75 to communicate the customer's selection to a commercial provider's remote office 78 (or to a centralized data bank or information superhighway).

The commercial provider preferably uses a "caller ID" function to identify the customer and can respond in a number of ways: (i) have a representative contact the customer; (ii) send the ordered merchandise or tickets to the customer; (iii) direct a data server 72 to provide programming or additional promotional material via a CATV line 76 to controller 73, which replays the material on the customer's TV set; or (iv) download and execute an interactive merchandise selection program on the customer's personal computer or any other electronic media input, output or sensory stimulating device.

The Apparatus Perspective

The various technologies used to implement the individual functional components that comprise a part of this invention are described below.

Touch Pad Technology

Sensor 3 can be implemented using a wide variety of presently available touch sensitive pad technology. See, for example, U.S. Pat. No. 5,016,008 entitled DEVICE FOR DETECTING THE POSITION OF A CONTROL MEMBER ON A TOUCH-SENSITIVE PAD, U.S. Pat. No. 5,012,124 entitled TOUCH SENSITIVE CONTROL PANEL, U.S. Pat. No. 4,862,151 entitled REMOTE CONTROL DEVICE FOR A COMPUTER ASSOCIATED WITH A VIDEO SCREEN, U.S. Pat. No. 4,827,084 entitled SOLID STATE IMAGE DETECTOR AND SIGNAL GENERATOR and U.S. Pat. No. 4,644,101 entitled PRESSURE-RESPONSIVE POSITION SENSOR, all of which are incorporated herein by reference.

Referring now to FIG. 2, a plurality of touch sensors 22 are embedded within the back binding of the printed matter 21. Alternatively, touch sensors 22 can be positioned along inner or outer margins of the binding, or of particular pages, of printed matter 21 (or along an edge of a mounting tray in which a disposable printed matter is placed). Electronics mounted within printed matter 21 (or within a mounting tray) responds to the actuation of a touch sensor 22 and transmits a coded signal indicative of the identity of the actuated sensor.

Advantageously, touch sensors can be combined with page sensors—as described in U.S. Pat. Nos. 5,209,665; 4,990,092; 4,636,881 and 4,809,246, all previously incorporated herein to provide a larger number of "effective sensors." In this embodiment, each time a sensor is actuated, the electronics within the printed matter also checks the page sensor(s) to determine which page is currently being viewed. The electronics then generates a coded signal that identifies both the sensor actuated and the currently visible page. Thus, each (page, sensor) combination represents, in essence, a single "effective sensor."

Hybrid embodiments combining touch pads and page sensors are also possible. For example, a printed matter might contain a sheet of touch sensors every so many pages, with the page interval being dependent on the stiffness of the pages and the responsiveness of the sensors. That is, if the maximum number of pages through which a user's touch could be reliably detected by a touch sensor was X, then the printed matter would preferably include a sheet of touch sensors every X pages of text.

Intelligent Controllers and Data/Communication Servers

In accordance with several embodiments of the invention, an intelligent controller controls the selection of programming in a video "file server" system. File servers are well known in the art. Generally, as used herein, the term intelligent controller can refer to computer equipment having either: (a) some type of mass storage device, typically a magnetic or magneto-optical disk, that is connected to a network and utilized as central storage for multiple users via the network; and/or (b) some type of network interface which allows establishment of a communication link with other user(s).

Referring to a "file server" type of intelligent controller, the information that is typically stored on such a system consists of binary computer data such as executable programs and corresponding data. Exemplary of the types of corresponding data stored are numbers for spreadsheets, ASCII characters and codes for word processors, and drawing commands for drawing and CAD programs. These or similar types of data do not generally have a time element associated with them, nor do they generally require any extra processing beyond the usual interpretation that is accomplished by the computer program with which they are intended to be used.

In contrast, the playback of audio/video information has a time element associated with its use. Furthermore, the amount of data required to store audio/video program information in "raw" digital form is often prohibitive. Thus, it is common to employ audio/video compression techniques to compress audio/video program information before it is stored. As a result, further processing in the form of decompression and digital-to-analog conversion is required before the real-time viewing of an audio/video program can take place. Decompression may be accomplished through the use of known hardware or software techniques. Digital-to-analog conversion may be required, depending on the type of equipment used for viewing the audio/video program. A known audio/video file server apparatus manufactured and marketed by Protocomm of Trevose, Pa. permits real-time playback of compressed audio/video program information.

Generally, modern audio/video file server systems include: a storage unit for centrally storing compressed digital audio/video program information, a transceiver for receiving compressed digital audio/video program information from an external source over a network (or wireless communication link) to update the stored audio/video program information, a plurality of playback units, each associated with an external playback line and an external playback station, each including a decompression unit, for receiving selected compressed digital audio/video program information from the storage unit, for decompressing the selected compressed digital audio/video program information received from the storage unit, and for playing it in real time over the associated playback line to the associated playback station, a network interface unit for receiving playback requests from the playback units, and a processor for controlling the storage and playback units to play the decompressed selected audio/video program information in real time for viewing by users at selected playback stations.

Such a system is described, for example, in U.S. Pat. No. 5,262,875 entitled AUDIO/VIDEO FILE SERVER INCLUDING DECOMPRESSION/PLAYBACK MEANS, which is incorporated herein by reference. The '875 system can be adapted to operate in accordance with the present invention by coupling intelligent controller of the present invention with the '875 system's network interface unit (which provides the playback requests to the playback unit). In the '875 system:

"Playback may be initiated through a user request from one of the playback stations or through direct interaction with audio/video file server 5. In the latter case, a simple user interface, such as a menu interface, may be employed for selection of the desired program information and the playback station. For example, a menu of the available items of audio/video program information, as named by the user or by the system, may be presented. The user may make a selection through cursor control keys on a keyboard."

In contrast, the present invention permits the user to select and control the presentation of audio/video programming through a familiar printed matter interface, as has been previously described. The present invention thus offers the advantage of nearly universal accessibility.

In accordance with the present invention, multimedia programming is preferably delivered from the file server(s) to the replay unit via an Integrated Service Digital Network (ISDN). U.S. Pat. No. 5,206,859 entitled ISDN MULTIMEDIA COMMUNICATIONS SYSTEM, incorporated herein by reference, describes such a system.

In accordance with the invention, a variety of means can be employed to communicate selection instructions to the video server and to communicate programming material from the server to the user's display unit. Since the selection instructions are very compact (i.e., low bandwidth), these instructions can be communicated via a standard telephone link using an inexpensive, low speed modem. This is similar, for example, to the method cable TV viewers use to select pay-per-view programming from local CATV companies—i.e., the viewer calls a particular toll-free number associated with the desired program, and the CATV office uses a "caller ID" function to determine which customer is to receive the program.

Communication of the programming material from the server to the display unit may require a higher-bandwidth means. No doubt, certain material—such as pricing information for a shop-at-home service or scheduling information for a travel booking service—could be easily transmitted via an inexpensive telephone/modem link. In addition, using the preferred compression/decompression techniques, many multi-media applications could also operate over a conventional telephone link. High quality audio/video programming, however, will likely require a higher bandwidth transmission medium, such as a CATV line, microwave link, DSB link, optical fiber link, cellular radio link, or enhanced bandwidth telephone connection.

Although the invention has been described above with reference to several presently preferred embodiments, such embodiments are merely exemplary and are not intended to define the scope of, or exhaustively enumerate the features of, the present invention. Accordingly, the scope of the invention shall be defined by the following claims. Where a feature or limitation of a preferred embodiment is omitted in a claim, it is the inventors' intent that such claim not be construed to impliedly require the omitted feature or limitation.

What is claimed is:

1. A system for displaying programming material to a user, the system comprising:
   a printed document issued by an educational institution having at least one machine recognizable feature;
   a feature recognition unit having associated therewith a means for recognizing said machine recognizable feature and a means for transmitting a coded signal in response to the recognition of said machine recognizable feature;
   an intelligent controller having associated therewith a means for accessing said programming material in response to receiving said coded signal; and
   a display unit for presenting said programming material.

2. A system as defined in claim 1 wherein said printed document issued by an educational institution comprises a course catalogue.

3. A system as defined in claim 1 wherein said printed document issued by an educational institution comprises a brochure about programs.

4. A system as defined in claim 1 wherein said printed document issued by an educational institution comprises a registration printed document.

5. A system as defined in claim 1 wherein said printed document issued by an educational institution comprises a financial aid application.

6. A system as defined in claim 1 wherein said printed document issued by an educational institution comprises instructional material.

7. A system as defined in claim 1 wherein said printed document issued by an educational institution comprises a test.

8. A system as defined in claim 1 wherein said printed document issued by an educational institution comprises a library card.

9. A system as defined in claim 1 wherein said printed document issued by an educational institution comprises an identification card.

10. A system as defined in claim 1 wherein said printed document issued by an educational institution comprises a tag.

11. A system as defined in claim 1 wherein said printed document issued by an educational institution comprises a decal.

12. A system as defined in claim 11 wherein said decal comprises a parking permit.

13. A system as defined in claim 1 wherein said printed document issued by an educational institution comprises an invoice.

14. A system as defined in claim 1 wherein said printed document issued by an educational institution comprises a receipt.

15. A system as defined in claim 1 wherein said printed document issued by an educational institution comprises a credit card.

16. A system as defined in claim 1 wherein said printed document issued by an educational institution comprises an application form.

17. A system as defined in claim 1 wherein said printed document issued by an educational institution comprises a transcript.

18. A system as defined in claim 1 wherein said printed document issued by an educational institution comprises a poster.

19. A system as defined in claim 1 wherein said printed document issued by an educational institution comprises a banner.

20. A system as defined in claim 1 wherein said printed document issued by an educational institution comprises a meal ticket.

21. A system as defined in claim 1 wherein said printed document issued by an educational institution comprises a schedule of events.

22. A system as defined in claim 21 wherein said schedule of events comprises athletic events.

23. A system as defined in claim 21 wherein said schedule of events comprises cultural events.

24. A system as defined in claim 1 wherein said printed document issued by an educational institution comprises a letter of recommendation.

25. A system as defined in claim 1 wherein said at least one machine recognizable feature has associated therewith a data link which is recognized by said feature recognition unit.

26. A system as defined in claim 25 wherein said data link comprises an image data link.

27. A system as defined in claim 25 wherein said data link comprises a video data link.

28. A system as defined in claim 25 wherein said data link comprises a programming data link.

29. A system as defined in claim 25 wherein said data link comprises a sound data link.

30. A system as defined in claim 25 wherein said data link comprises an online data link.

31. A system as defined in claim 25 wherein said data link comprises an online shopping data link.

32. A system as defined in claim 25 wherein said data link comprises a pictorial data link.

33. A system as defined in claim 25 wherein said data link comprises an electronic data link.

34. A system as defined in claim 25 wherein said data link comprises an electronic media link.

35. A system as defined in claim 25 wherein said data link comprises an "information superhighway" data link.

36. A system as defined in claim 35 wherein said "information superhighway" data link comprises the internet.

37. A system as defined in claim 35 wherein said "information superhighway" data link comprises the world wide web.

38. A system as defined in claim 35 wherein said "information superhighway" data link comprises a computer network.

39. A system as defined in claim 35 wherein said "information superhighway" data link comprises an integrated service digital network (ISDN).

40. A system as defined in claim 35 wherein said "information superhighway" data link comprises a telephone line.

41. A system as defined in claim 35 wherein said "information superhighway" data link comprises a cable television (CATV) line.

42. A system as defined in claim 35 wherein said "information superhighway" data link comprises a local area network.

43. A system as defined in claim 35 wherein said "information superhighway" data link comprises a wide area network.

44. A system as defined in claim 35 wherein said "information superhighway" data link comprises a data communications network.

45. A system as defined in claim 35 wherein said "information superhighway" data link comprises an Internet Product Service Directory.

46. A system as defined in claim 35 wherein said "information superhighway" data link comprises a globally based digital communications network.

47. A system as defined in claim 35 wherein said "information superhighway" data link comprises a wireless network link.

48. A system as defined in claim 35 wherein said "information superhighway" data link comprises a Wireless Application Protocol internet.

49. A system as defined in claim 35 wherein said "information superhighway" data link comprises an ethernet network.

50. A system as defined in claim 35 wherein said "information superhighway" data link comprises a radio frequency ("RF") cellular network.

51. A system as defined in claim 1 wherein said at least one machine recognizable feature comprises a bar code.

52. A system as defined in claim 51 wherein said bar code comprises a Universal Product Code.

53. A system as defined in claim 51 wherein said at least one machine recognizable feature comprises an invisible bar code.

54. A system as defined in claim 1 wherein said at least one machine recognizable feature comprises a magnetic code.

55. A system as defined in claim 1 wherein said at least one machine recognizable feature comprises a printed character.

56. A system as defined in claim 1 wherein said at least one machine recognizable feature comprises a symbol.

57. A system as defined in claim 1 wherein said at least one machine recognizable feature comprises a pictorial icon.

58. A system as defined in claim 1 wherein said at least one machine recognizable feature comprises an invisible indicia.

59. A system as defined in claim 1 wherein said at least one machine recognizable feature comprises a two-dimensional figure.

60. A system as defined in claim 1 wherein said at least one machine recognizable feature comprises an icon.

61. A system as defined in claim 1 wherein said at least one machine recognizable feature comprises an invisible icon.

62. A system as defined in claim 1 wherein said at least one machine recognizable feature comprises a watermark.

63. A system as defined in claim 1 wherein said at least one machine recognizable feature comprises an invisible watermark.

64. A system as defined in claim 63 wherein said invisible watermark comprises a digital watermark.

65. A system as defined in claim 1 wherein said at least one machine recognizable feature comprises a series of alphanumeric characters.

66. A system as defined in claim 1 wherein said at least one machine recognizable feature comprises a binary code.

67. A system as defined in claim 1 wherein said at least one machine recognizable feature comprises a digital watermark.

68. A system as defined in claim 1 wherein said at least one machine recognizable feature comprises a magnetic strip.

69. A system as defined in claim 1 wherein said at least one machine recognizable feature comprises a code.

70. A system as defined in claim 1 wherein said at least one machine recognizable feature comprises an online shopping product code.

71. A system as defined in claim 1 wherein said at least one machine recognizable feature comprises a home shopping product code.

72. A system as defined in claim 1 wherein said at least one machine recognizable feature comprises an online shopping service code.

73. A system as defined in claim 1 wherein said at least one machine recognizable feature comprises a home shopping service code.

74. A system as defined in claim 1 wherein said at least one machine recognizable feature comprises an analog pattern.

75. A system as defined in claim 1 wherein said at least one machine recognizable feature comprises a hieroglyphic character.

76. A system as defined in claim 1 wherein said programming material comprises information.

77. A system as defined in claim 76 wherein said information comprises information about an educational institution.

78. A system as defined in claim 76 wherein said information comprises information about an individual identified by said printed document issued by an educational institutional.

79. A system as defined in claim 76 wherein said information comprises a "background check" of an individual identified by said printed document issued by an educational institutional.

80. A system as defined in claim 76 wherein said information comprises information about an organization identified by said printed document issued by an educational institutional.

81. A system as defined in claim 76 wherein said information comprises a "background check" of an organization identified by said printed document issued by an educational institutional.

82. A system as defined in claim 76 wherein said information comprises information about a product associated with said educational institution.

83. A system as defined in claim 76 wherein said information comprises a description of the campus of an educational institution.

84. A system as defined in claim 76 wherein said information comprises a map of a campus.

85. A system as defined in claim 76 wherein said information comprises a map of the locale of the campus.

86. A system as defined in claim 76 wherein said information comprises directions for traveling to the campus.

87. A system as defined in claim 76 wherein said information comprises information about visitor accommodations.

88. A system as defined in claim 76 wherein said information comprises an academic calendar.

89. A system as defined in claim 76 wherein said information comprises course information.

90. A system as defined in claim 76 wherein said information comprises application requirements.

91. A system as defined in claim 76 wherein said information comprises financial aid information.

92. A system as defined in claim 76 wherein said information comprises tuition schedules.

93. A system as defined in claim 76 wherein said information comprises course grades.

94. A system as defined in claim 76 wherein said information comprises information on job opportunities in the locale of said educational institution.

95. A system as defined in claim 1 wherein said programming material comprises a service.

96. A system as defined in claim 95 wherein said service includes displaying promotional programming material on said display unit of said user.

97. A system as defined in claim 95 wherein said service includes conducting an interaction with said user via a telephone.

98. A system as defined in claim 95 wherein said service includes conducting an interaction between a plurality of users via an online communication chat link.

99. A system as defined in claim 95 wherein said service includes a virtual tour of an educational institution.

100. A system as defined in claim 95 wherein said service includes conducting an interaction with said user and an educational institution staff member.

101. A system as defined in claim 95 wherein said service includes conducting an interaction with said user and a student.

102. A system as defined in claim 95 wherein said service includes registering for courses.

103. A system as defined in claim 95 wherein said service includes cancelling courses.

104. A system as defined in claim 95 wherein said service includes applying for admission.

105. A system as defined in claim 95 wherein said service includes registering for online courses.

106. A system as defined in claim 95 wherein said service includes applying for financial aid.

107. A system as defined in claim 95 wherein said service includes paying tuition and fees.

108. A system as defined in claim 95 wherein said service includes taking an online examination.

109. A system as defined in claim 95 wherein said service includes obtaining tickets for events.

110. A system as defined in claim 109 wherein said events comprise on-campus events.

111. A system as defined in claim 109 wherein said events comprise off-campus events.

112. A system as defined in claim 95 wherein said service includes tracking a users online activities.

113. A system as defined in claim 1 wherein said display unit comprises a personal computer.

114. A system as defined in claim 113 wherein said personal computer comprises a laptop computer.

115. A system as defined in claim 1 wherein said display unit comprises a television.

116. A system as defined in claim 1 wherein said display unit comprises a device containing a microprocessor.

117. A system as defined in claim 116 wherein said device containing a microprocessor is hand-held.

118. A system as defined in claim 116 wherein said device containing a microprocessor is portable.

119. A system as defined in claim 1 wherein said display unit comprises a personal digital planner.

120. A system as defined in claim 1 wherein said display unit comprises an internet appliance.

121. A system as defined in claim 1 wherein said display unit comprises a cellular telephone.

122. A system as defined in claim 1 wherein said display unit comprises a wireless communication device.

123. A system as defined in claim 1 wherein said display unit comprises a simulated book.

124. A system as defined in claim 1 wherein said display unit comprises an intelligent terminal.

125. A system as defined in claim 1 wherein said display unit comprises a web-based television.

126. A system as defined in claim 1 wherein said display unit comprises a pager.

127. A system as defined in claim 1 wherein said display unit comprises an Internet-enabled telephone.

128. A system as defined in claim 1 wherein said feature recognition unit is selected from a group consisting of a hand-held unit, a scanner, a bar code scanner, an optical code reader, an optical reader, a personal camera, a personal computer reader, a digital camera, a digital mouse and an optical mouse.

129. A system as defined in claim 128 wherein said feature recognition unit is linked to a personal computer.

130. A system as defined in claim 128 wherein said feature recognition unit is linked to a wireless interface.

131. A system as defined in claim 130 wherein said wireless interface comprises a wireless network.

132. A system as defined in claim 131 wherein said wireless network comprises a cellular network.

133. A system as defined in claim 130 wherein said wireless interface comprises a cellular telephone.

134. A system as defined in claim 130 wherein said wireless interface comprises a pager.

135. A system as defined in claim 130 wherein said wireless interface comprises a wireless personal computer.

136. A system as defined in claim 130 wherein said wireless interface comprises a personal digital assistant.

137. A system as defined in claim 130 wherein said feature recognition unit is linked to a personal digital assistant.

138. A system as defined in claim 128 wherein said feature recognition unit is linked to an Internet appliance.

139. A system as defined in claim 128 wherein said feature recognition unit is linked to a television set.

140. A system as defined in claim 128 wherein said feature recognition unit comprises a portion of a cellular telephone.

141. A system as defined in claim 128 wherein said feature recognition unit comprises a portion of a personal digital assistant.

142. A system as defined in claim 128 wherein said feature recognition unit comprises a portion of a remote control unit.

143. A system as defined in claim 128 wherein said feature recognition unit comprises a portion of a handwriting implement.

144. A method of providing a user access to programming material, comprising the steps of:

printing a machine recognizable feature within a printed document issued by an educational institution;

scanning said machine recognizable feature of said printed document issued by an educational institution; and transmitting data associated with said machine recognizable feature via a communication link to access said programming material, wherein said programming material is related to said printed document issued by an educational institution.

145. The method of claim 144 wherein said communication link includes the Internet.

146. The method of claim 144 wherein said machine recognizable feature is selected from a group consisting of bar code, universal product code, invisible bar code, magnetic code, printed character, symbol, invisible indicia, two-dimensional figure, icon, invisible icon, watermark, invisible watermark, digital watermark, series of alphanumeric characters, binary code, magnetic strip, code, analog pattern, and hieroglyphic character.

147. A method of providing a user access to supplemental programming material associated with a printed document issued by an educational institution, comprising the steps of:

printing a machine recognizable feature within said printed document issued by an educational institution, wherein said machine recognizable feature has associated therewith a command sequence for accessing programming material;

scanning said machine recognizable feature within said printed document issued by an educational institution and downloading data indicative of said machine recognizable feature via the Internet to a remote server;

accessing programming material from said remote server; and transmitting said programming material to said user allowing said user to perceive said programming material in a humanly perceivable form, wherein said programming material is related to said printed document issued by an educational institution.

148. The method of claim 147 wherein said programming material comprises multimedia.

149. The method of claim 147 wherein said machine recognizable feature is selected from a group consisting of a bar code, a universal product code, invisible bar code, magnetic code, printed character, symbol, invisible indicia, two-dimensional figure, icon, invisible icon, watermark, invisible watermark, digital watermark, series of alphanumeric characters, binary code, magnetic strip, code, analog pattern, and hieroglyphic character.

* * * * *